(12) United States Patent
Isomura et al.

(10) Patent No.: US 9,381,906 B2
(45) Date of Patent: Jul. 5, 2016

(54) VEHICLE DRIVING DEVICE

(75) Inventors: Haruo Isomura, Susono (JP); Hiroaki Ebuchi, Hadano (JP); Hiroyuki Shibata, Odawara (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/385,344

(22) PCT Filed: Mar. 15, 2012

(86) PCT No.: PCT/JP2012/056685
§ 371 (c)(1),
(2), (4) Date: Sep. 15, 2014

(87) PCT Pub. No.: WO2013/136483
PCT Pub. Date: Sep. 19, 2013

(65) Prior Publication Data
US 2015/0039170 A1 Feb. 5, 2015

(51) Int. Cl.
| | |
|---|---|
| *B60W 10/04* | (2006.01) |
| *B60W 20/00* | (2016.01) |
| *B60K 6/547* | (2007.10) |
| *B60W 10/113* | (2012.01) |
| *F16H 3/12* | (2006.01) |
| *B60K 6/48* | (2007.10) |

(52) U.S. Cl.
CPC .............. *B60W 20/10* (2013.01); *B60K 6/547* (2013.01); *B60W 10/113* (2013.01); *F16H 3/126* (2013.01); *B60K 2006/4816* (2013.01); *F16H 2200/0047* (2013.01); *F16H 2200/2005* (2013.01); *Y02T 10/6256* (2013.01)

(58) Field of Classification Search
USPC .................................. 701/22; 477/36; 475/5
See application file for complete search history.

(56) References Cited

U.S. PATENT DOCUMENTS

| | | | |
|---|---|---|---|
| 2010/0009805 A1 | 1/2010 | Bachmann | |
| 2010/0173746 A1* | 7/2010 | Ideshio | B60K 6/365 |
| | | | 477/36 |

FOREIGN PATENT DOCUMENTS

| | | |
|---|---|---|
| CN | 101678751 A | 3/2010 |
| JP | 2009-1079 A | 1/2009 |
| JP | 2009-036354 A | 2/2009 |
| JP | 2010513107 A | 4/2010 |
| JP | 2010-149840 A | 7/2010 |
| JP | 2010-269661 A | 12/2010 |

* cited by examiner

*Primary Examiner* — Adam Tissot
(74) *Attorney, Agent, or Firm* — Kenyon & Kenyon LLP

(57) ABSTRACT

A vehicle driving device includes: a rotating electrical machine; a first shaft and a second shaft respectively connected to a drive shaft; and a differential mechanism including a rotation component connected to the rotating electrical machine, a rotation component connected to the first shaft, and a rotation component connected to the second shaft. The vehicle driving device includes a predetermined mode in which a transmission of a power through the second shaft is disconnected, a differential operation of the differential mechanism is regulated, and the rotating electrical machine and the drive shaft are connected to each other through the first shaft. Each of the first shaft and the second shaft may include a transmission mechanism.

9 Claims, 23 Drawing Sheets

| | GEAR RATIO |
|---|---|
| 1st | 3.5 |
| 2nd | 1.9 |
| 3rd | 1.2 |
| 4th | 0.9 |
| 5th | 0.7 |
| DIFFERENTIAL RATIO | 4.5 |

| CURRENT STAGE | 1st | 2nd | 3rd | 4th | 5th | | | |
|---|---|---|---|---|---|---|---|---|
| ESTIMATION OF NEXT STAGE | Up | Down | Up | Down | Up | Down | Up | Down |
| INTERMEDIATE STAGE | 1st | 1st | 2nd | 2nd | 3rd | 3rd | 4th | 4th |
| $\gamma$ | 1.00 | 1.84 | 1.00 | 1.58 | 1.00 | 1.33 | 1.00 | 1.29 |
| $\delta$ (%) | 76.9 | 70.6 | 76.9 | 82.1 | 76.9 | 97.5 | 76.9 | 98.9 |
| $\eta$ (%) | 84.7 | 88.4 | 84.7 | 79.6 | 84.7 | -58.0 | 84.7 | -262 |

FIG.44

| CURRENT | 1st | 2nd | | 3rd | | 4th | | 5th |
|---|---|---|---|---|---|---|---|---|
| NEXT | Up | Down | Up | Down | Up | Down | Up | Down |
| INTERMEDIATE STAGE | 1.5th | 1.5th | 2.5th | 2.5th | 3.5th | 3.5th | 4.5th | 4.5th |
| $\gamma$ | 0.77 | 1.42 | 0.82 | 1.29 | 0.88 | 1.17 | 0.89 | 1.14 |
| $\delta$ (%) | 77 | 70 | 82 | 77 | 88 | 86 | 89 | 88 |
| $\eta$ (%) | 85 | 89 | 80 | 84 | 70 | 74 | 66 | 70 |

FIG.45

| ODD SPEED SHIFT STAGE | 1st | 3rd | 3rd | 5th |
|---|---|---|---|---|
| EVEN SPEED SHIFT STAGE | 2nd | 2nd | 4th | 4th |
| $\gamma$ | 0.54 | 1.58 | 0.75 | 1.29 |
| $\delta$ (%) | 54 | 63 | 75 | 78 |
| $\eta$ (%) | 93 | 91 | 86 | 84 |

VEHICLE DRIVING DEVICE

CROSS-REFERENCE TO RELATED APPLICATIONS

This is a national phase application based on the PCT International Patent Application No. PCT/JP2012/056685 filed Mar. 15, 2012, the entire contents of which are incorporated herein by reference.

FIELD

The present invention relates to a vehicle driving device.

BACKGROUND

Hitherto, there has been known a vehicle including a plurality of shafts capable of transmitting a power therethrough. For example, Patent Literature 1 discloses a technique of a hybrid vehicle power transmission system control method of outputting a torque of an engine from a second intermediate shaft to an output shaft through a first intermediate shaft when a first clutch of the first intermediate shaft may not be engaged.

CITATION LIST

Patent Literature

Patent Literature 1: Japanese Patent Application Laid-open No. 2009-36354

SUMMARY

Technical Problem

Here, there is a case in which the transmission efficiency is degraded when a plurality of shafts capable of transmitting a power therethrough is provided. For example, there is a concern that the transmission efficiency may be degraded due to a power circulation. Thus, it is desirable to suppress degradation in transmission efficiency.

An object of the invention is to provide a vehicle driving device capable of suppressing degradation in transmission efficiency.

Solution to Problem

A vehicle driving device according to the present invention includes a rotating electrical machine; first and second shafts configured to be respectively connected to drive shafts; and a differential mechanism configured to include a rotation component connected to the rotating electrical machine, a rotation component connected to the first shaft, and a rotation component connected to the second shaft, wherein a predetermined mode is provided in which a transmission of a power through the second shaft is disconnected, a differential operation of the differential mechanism is regulated, and the rotating electrical machine and the drive shaft are connected to each other through the first shaft.

In the vehicle driving device, it is preferable to further include a transmission mechanism which is provided in each of the first shaft and the second shaft, wherein the predetermined mode is set at the time a ratio between a gear ratio of the transmission mechanism of the first shaft and a gear ratio of the transmission mechanism of the second shaft is a value within a predetermined range.

In the vehicle driving device, it is preferable to further include a transmission mechanism which is provided in each of the first shaft and the second shaft, wherein the predetermined mode is set based on transmission efficiency determined from a ratio between a gear ratio of the transmission mechanism of the first shaft and a gear ratio of the transmission mechanism of the second shaft.

In the vehicle driving device, it is preferable that a regeneration operation is performed by the rotating electrical machine in the predetermined mode.

In the vehicle driving device, it is preferable that the predetermined mode is set at the time the vehicle runs backward.

In the vehicle driving device, it is preferable to further include an engine which is connected to the first shaft, wherein at the time the differential operation of the differential mechanism is regulated, a rotation direction of a rotation transmitted from the engine to the drive shaft through the first shaft is switched to a rotation direction causing the vehicle to run backward.

In the vehicle driving device, it is preferable to further include an engine which is connected to the first shaft and the second shaft through a clutch; wherein the predetermined mode is set at the time a regeneration operation is performed by the rotating electrical machine with the clutch released while the vehicle runs by using the engine as a power source with the clutch engaged.

Advantageous Effects of Invention

According to the invention, provided is a vehicle driving device including: a rotating electrical machine; first and second shafts that are respectively connected to drive shafts; and a differential mechanism that includes a rotation component connected to the rotating electrical machine, a rotation component connected to the first shaft, and a rotation component connected to the second shaft, wherein a predetermined mode is provided in which a transmission of a power through the second shaft is disconnected, a differential operation of the differential mechanism is regulated, and the rotating electrical machine and the drive shaft are connected to each other through the first shaft. According to the vehicle driving device of the invention, there is an advantage that degradation in transmission efficiency may be suppressed by suppressing the power circulation by the predetermined mode.

BRIEF DESCRIPTION OF DRAWINGS

FIG. 44 is a diagram illustrating an example of the power circulation ratio δ and the total transmission efficiency η in the standby state of each speed shift stage of the vehicle according to the first modified example of the embodiment.

FIG. 45 is a diagram illustrating an example of the power circulation ratio δ and the total transmission efficiency η in the standby state of each speed shift stage of the vehicle according to the second modified example of the embodiment.

DESCRIPTION OF EMBODIMENTS

Hereinafter, a vehicle driving device according to an embodiment of the invention will be described in detail with reference to the drawings. Furthermore, the invention is not limited to the embodiment. Further, components in the following embodiments include a component which may be easily supposed by the person skilled in the art or a component which has substantially the same configuration.

EMBODIMENT

Figure 1:
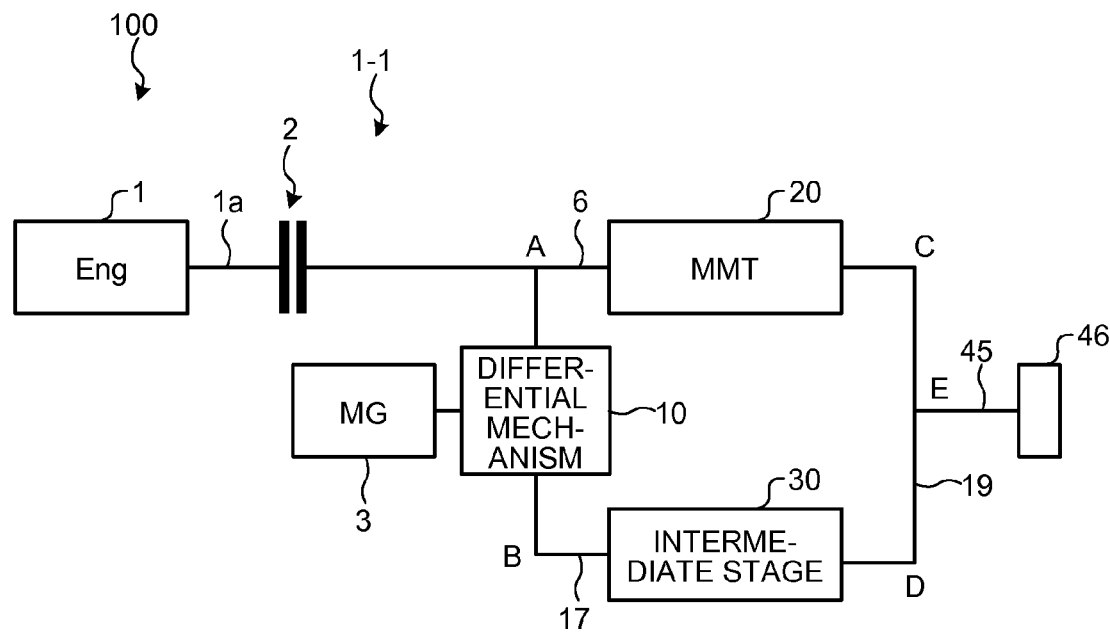
FIG. 1 is a schematic configuration diagram of a vehicle according to an embodiment.

An embodiment will be described with reference to FIGS. 1 to 32. The embodiment relates to a vehicle driving device. FIG. 1 is a schematic configuration diagram of a vehicle 100 according to the embodiment of the invention, FIG. 2 is a diagram illustrating a configuration example in which a single pinion type planetary gear mechanism is provided, FIG. 3 is a diagram illustrating a configuration example in which a double pinion type planetary gear mechanism is provided, and FIG. 4 is a skeleton diagram of the vehicle 100 according to the embodiment.

As illustrated in FIG. 1, the vehicle 100 includes an engine 1, a clutch 2, a rotating electrical machine 3, a differential mechanism 10, a first transmission unit 20, a second transmission unit 30, a drive shaft 45, and a driving wheel 46. Further, a vehicle driving device 1-1 according to the embodiment includes the rotating electrical machine 3, the first transmission unit 20, the second transmission unit 30, and the differential mechanism 10. Furthermore, the vehicle driving device 1-1 may further include the engine 1 or an ECU 50 to be described later.

Figure 2:
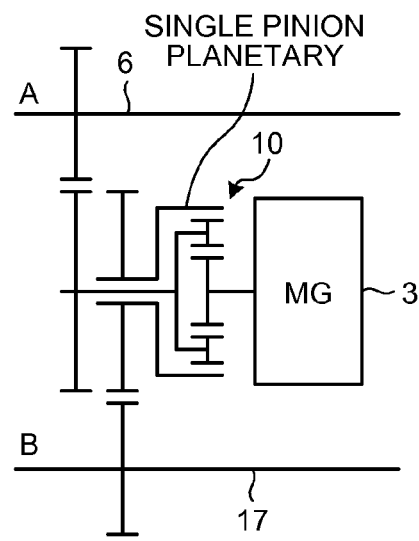
FIG. 2 is a diagram illustrating a configuration example in which a single pinion type planetary gear mechanism is provided.
Figure 3:
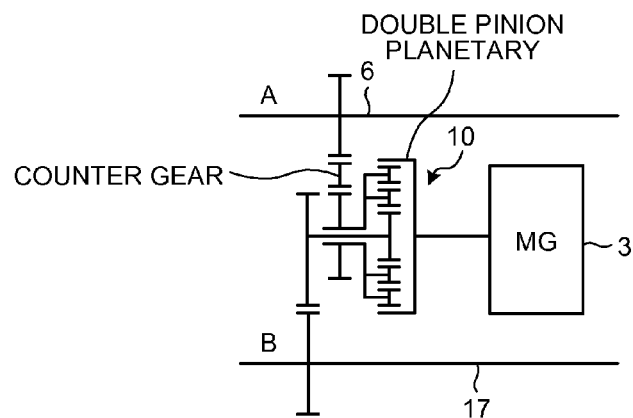
FIG. 3 is a diagram illustrating a configuration example in which a double pinion type planetary gear mechanism is provided.
Figure 4:
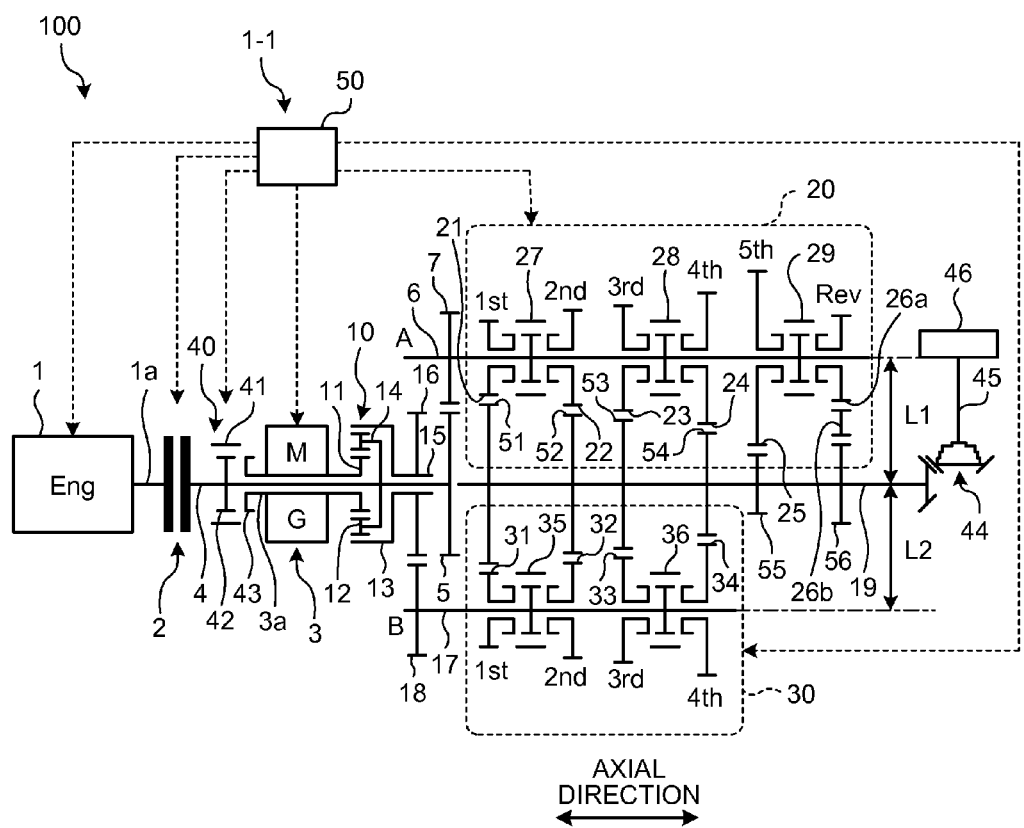
FIG. 4 is a skeleton diagram of the vehicle according to the embodiment.

As the connection configuration for the rotating electrical machine 3, an input shaft 6 of the first transmission unit 20, and an input shaft 17 of the second transmission unit 30 and the differential mechanism 10, for example, a connection configuration using the single pinion type planetary gear mechanism illustrated in FIG. 2 or a connection configuration using the double pinion type planetary gear mechanism illustrated in FIG. 3 may be employed. As illustrated in FIG. 4, the differential mechanism 10 of the vehicle driving device 1-1 according to the embodiment is a single pinion type planetary gear mechanism.

The engine 1 converts fuel combustion energy into a rotation of a rotation shaft 1a and outputs the rotation. Furthermore, as an engine of the vehicle 100, the other known engine may be used instead of the engine 1. The rotation shaft 1a of the engine 1 is connected to a rotation shaft 4 through the clutch 2. The rotation shaft 4 is disposed on the extension line of the rotation shaft 1a so as to be coaxial with the rotation shaft 1a of the engine 1.

The clutch 2 is an automatic clutch device. The clutch 2 includes an input side engagement member connected to the rotation shaft 1a and an output side engagement member connected to the rotation shaft 4. The clutch 2 is engaged or released by an actuator which is operated by a hydraulic pressure and the like. The clutch 2 may be controlled in a complete engagement state, a semi-engagement state, or a release state in response to the supplied hydraulic pressure.

The rotating electrical machine 3 is disposed at the outside of the rotation shaft 4 in the radial direction so as to be coaxial with the rotation shaft 4. A rotation shaft 3a of the rotating electrical machine 3 is supported so as to be rotatable with respect to the rotation shaft 4. The rotation shaft 4 is provided with a drive gear 5. The drive gear 5 is disposed at the end opposite to the engine 1 in the rotation shaft 4. The drive gear 5 meshes with a driven gear 7. The driven gear 7 is provided in the input shaft 6 of the first transmission unit 20.

The driven gear 7, a drive gear 21, a sleeve 27, drive gears 22 and 23, a sleeve 28, drive gears 24 and 25, a sleeve 29, and a drive gear 26a are disposed in this order from the engine 1 in the input shaft 6.

The differential mechanism 10 includes a sun gear 11, a pinion gear 12, a ring gear 13, and a carrier 14. The ring gear 13 is disposed at the outside of the sun gear 11 in the radial direction so as to be coaxial with the sun gear 11. The pinion gear 12 is disposed between the sun gear 11 and the ring gear 13, and meshes with the sun gear 11 and the ring gear 13. The pinion gear 12 is rotatably supported by the carrier 14.

The sun gear 11 is a rotation component which is connected to the rotation shaft 3a of the rotating electrical machine 3, and rotates together with the rotation shaft 3a. The rotating electrical machine 3 has a function as a motor (an electric motor) and a function as a generator. The rotating electrical machine 3 is connected to a battery through an inverter. The rotating electrical machine 3 may convert an electrical power supplied from the battery into a mechanical power and output the mechanical power, and may convert a mechanical power into an electrical power while being driven by a power input thereto. The electrical power which is generated by the rotating electrical machine 3 may be stored in the battery. As the rotating electrical machine 3, for example, an AC synchronous motor generator may be used.

The rotating electrical machine 3 outputs a torque by consuming an electrical power during a powering operation, and may rotationally drive the sun gear 11 by the output torque. Further, the rotating electrical machine 3 generates an electrical power while being rotationally driven by the torque transmitted through the sun gear 11 during a regeneration operation, and may exert a load torque generated in response to a generation load on the sun gear 11.

The carrier 14 is connected to the rotation shaft 4, and rotates together with the rotation shaft 4. The carrier 14 is a rotation component which is connected to the first transmission unit 20 through the rotation shaft 4 and the drive gear 5. The pinion gear 12 may rotate (revolve) about the center axis of the rotation shaft 4 along with the carrier 14, and may rotate (spin) about the center axis of the pinion gear 12 while being supported by the carrier 14. A drive gear 16 is connected to the ring gear 13 through a cylindrical member 15. The cylindrical member 15 is a cylindrical member having a diameter smaller than that of the ring gear 13. The cylindrical member 15 is connected to the opposite side to the engine with respect to the ring gear 13 in the axial direction. The drive gear 16 is disposed on the outer peripheral surface of the cylindrical member 15. The drive gear 16 meshes with a driven gear 18.

The driven gear 18 is provided in the input shaft 17 of the second transmission unit 30. That is, the ring gear 13 is a rotation component which is connected to the second transmission unit 30 through the drive gear 16. The input shaft 6 of the first transmission unit 20, the input shaft 17 of the second transmission unit 30, and an output shaft 19 are disposed so as to be parallel to each other. The gear ratio between the drive gear 5 and the driven gear 7 is the same as the gear ratio between the drive gear 16 and the driven gear 18.

A lock mechanism 40 has a function of regulating the relative rotation between the carrier 14 and the sun gear 11 of the differential mechanism 10. The lock mechanism 40 according to the embodiment is a meshing type dog clutch. The lock mechanism 40 includes a sleeve 41, a dog tooth 42 which is connected to the rotation shaft 4, and a dog tooth 43 which is connected to the rotation shaft 3a of the rotating electrical machine 3. The dog tooth 42 and the dog tooth 43 are disposed adjacent to each other in the axial direction. The sleeve 41 is disposed at the outside of the dog teeth 42 and 43 in the radial direction, and is movable in the axial direction. The sleeve 41 includes an internal tooth which engages with the dog teeth 42 and 43. The lock mechanism 40 is switched between an engagement state and a release state by driving the sleeve 41 by an actuator (not illustrated) so as to be moved in the axial direction.

The engaged lock mechanism 40 regulates the relative rotation of the dog teeth 42 and 43 while the sleeve 41 engages with the dog teeth 42 and 43. That is, the engaged lock mechanism 40 regulates the relative rotation between the sun gear 11 and the carrier 14, and locks the differential mechanism 10 so that the differential operation can not be performed. On the contrary, in the released lock mechanism 40, the sleeve 41 engages with any one of the dog teeth 42 and 43, and the engagement with the other thereof is released. Thus, the released lock mechanism 40 allows the relative rotation between the sun gear 11 and the carrier 14, and allows the differential operation of the differential mechanism 10. Furthermore, the combination of the rotation components engaged by the lock mechanism 40 is not limited to the sun gear 11 and the carrier 14. The lock mechanism 40 may connect any two or more rotation components of the sun gear 11, the ring gear 13, and the carrier 14 of the differential mechanism 10 so as to regulate the differential operation thereof.

The first transmission unit 20 includes the input shaft 6, the drive gears 21, 22, 23, 24, and 25 of the respective speed shift stages, the reverse running drive gear 26a, an idle gear 26b, the sleeves 27, 28, and 29, the driven gears 51, 52, 53, 54, 55, and 56, and the output shaft 19. The transmission mechanism of the first transmission unit 20 includes the drive gears 21, 22, 23, 24, and 25, the reverse running drive gear 26a, the idle gear 26b, the sleeves 27, 28, and 29, and the driven gears 51, 52, 53, 54, 55, and 56.

The drive gears 21, 22, 23, 24, 25, and 26a are respectively supported so as to be rotatable with respect to the input shaft 6. The driven gears 51, 52, 53, 54, 55, and 56 are respectively connected to the output shaft 19, and rotate together with the output shaft 19.

The drive gear 21 and the driven gear 51 make a pair of meshing gears of a first speed shift stage, the drive gear 22 and the driven gear 52 make a pair of meshing gears of a second speed shift stage, the drive gear 23 and the driven gear 53 make a pair of meshing gears of a third speed shift stage, the drive gear 24 and the driven gear 54 make a pair of meshing gears of a fourth speed shift stage, and the drive gear 25 and the driven gear 55 make a pair of meshing gears of a fifth speed shift stage. The reverse running drive gear 26a is connected to the driven gear 56 through the idle gear 26b.

The first transmission unit 20 may connect any one of the drive gears 21, 22, 23, 24, and 25 to the input shaft 6 by driving the sleeves 27, 28, and 29 by the actuator so as to move in the axial direction. Accordingly, the input shaft 6 is connected to the output shaft 19 through any pair of gears from the first speed shift stage to the fifth speed shift stage, and hence the rotation may be transmitted at the gear ratio of the pair of gears. Further, the first transmission unit 20 may rotate the output shaft 19 in the revere running rotation direction by connecting the input shaft 6 to the output shaft 19 through the reverse running gear groups 26a, 26b, and 56 instead of the speed shift stages from the first speed to the fifth speed. Further, the first transmission unit 20 may enter a neutral state by releasing all drive gears 21, 22, 23, 24, 25, and 26a with the movement of the sleeves 27, 28, and 29 in the axial direction. The first transmission unit 20 in the neutral state disconnects the transmission of the power between the input shaft 6 and the output shaft 19.

The second transmission unit 30 includes the input shaft 17, drive gears 31, 32, 33, and 34 of respective speed shift stages, sleeves 35 and 36, driven gears 51, 52, 53, and 54, and the output shaft 19. The transmission mechanism of the second transmission unit 30 includes the drive gears 31, 32, 33, and 34, the sleeves 35 and 36, and the driven gears 51, 52, 53, and 54.

The drive gears 31, 32, 33, and 34 are respectively supported so as to be rotatable with respect to the input shaft 17. The second transmission unit 30 includes speed shift stages equivalent to the speed shift stages from the first speed to the fourth speed of the first transmission unit 20. As illustrated in FIG. 4, the center axis distance L1 between the output shaft 19 and the input shaft 6 is equal to the center axis distance L2 between the output shaft 19 and the input shaft 17.

The drive gear 31 and the driven gear 51 make a pair of meshing gears of a first speed shift stage. The drive gear 32 and the driven gear 52 make a pair of meshing gears of a second speed shift stage. The drive gear 33 and the driven gear 53 make a pair of meshing gears of a third speed shift stage. The drive gear 34 and the driven gear 54 make a pair of meshing gears of a fourth speed shift stage.

The second transmission unit 30 may connect any one of the drive gears 31, 32, 33, and 34 to the input shaft 17 by driving the sleeves 35 and 36 by the actuator so as to move in the axial direction. Accordingly, the input shaft 17 is connected to the output shaft 19 through any pair of gears from the first speed shift stage to the fourth speed shift stage, and hence the rotation may be transmitted at the gear ratio of the pair of gears. Further, the second transmission unit 30 may enter the neutral state by releasing all drive gears 31, 32, 33, and 34 with the movement of the sleeves 35 and 36 in the axial direction. The second transmission unit 30 in the neutral state disconnects the transmission of the power between the input shaft 17 and the output shaft 19.

The first transmission unit 20 and the second transmission unit 30 are respectively connected to the drive shaft 45 of the vehicle 100 through the common output shaft 19. Specifically, the end opposite to the engine 1 in the output shaft 19 is connected to the right and left drive shafts 45 through a differential device 44. The driving wheel 46 is connected to the drive shaft 45.

In the embodiment, the first transmission unit 20 has a function as a main transmission and the second transmission unit 30 has a function as a sub-transmission. The first transmission unit 20 is a MMT (Multi-mode Manual Transmission), and the change of the speed shift stage and the engagement/release of the clutch 2 are automatically controlled. For example, the target speed shift stage of the first transmission unit 20 may be determined based on a user's shift operation or may be automatically determined based on a running state. The second transmission unit 30 transmits a power instead of the first transmission unit 20, for example, when the speed shift stage is changed in the first transmission unit 20 during an engine running operation. In the second transmission unit 30, the change of the speed shift stage and the engagement/release of the clutch 2 are automatically controlled. In the description below, the speed shift stage of the first transmission unit 20 is referred to as a main speed shift stage, and the speed shift stage of the second transmission unit 30 is referred to as a sub-speed shift stage.

The vehicle 100 is equipped with the ECU 50. The ECU 50 is an electronic control unit including a computer. The ECU 50 has a function as a control device that controls the respective components of the vehicle 100. The ECU 50 is electrically connected to the engine 1, the clutch 2, the rotating electrical machine 3, the lock mechanism 40, the first transmission unit 20, and the second transmission unit 30, and may control the engine 1, the clutch 2, the rotating electrical machine 3, the lock mechanism 40, the first transmission unit 20, and the second transmission unit 30.

In the vehicle 100 according to the embodiment, the engine running operation and the EV running operation may be performed. The engine running operation is a running operation in which the clutch 2 is engaged and the vehicle 100 runs by using the engine 1 as a power source. In the engine running operation, the vehicle 100 may run by transmitting the engine torque to the drive shaft 45 through any one of the first transmission unit 20 and the second transmission unit 30.

The EV running operation is a running operation which causes the vehicle 100 to run by using the rotating electrical machine 3 as a power source. In the EV running operation, the vehicle 100 may run while the clutch 2 is released and the engine 1 is stopped. In the EV running operation, the rotating electrical machine 3 outputs a torque by a powering operation so that the driving wheel 46 is rotationally driven so as to cause the vehicle 100 to run. Also, a regeneration operation may be performed in which the rotating electrical machine 3 is rotationally driven by the torque transmitted from the driving wheel 46 so as to generate an electrical power in the EV running operation. In the EV running operation, the first transmission unit 20 and the second transmission unit 30 respectively form the speed shift stages, and generate a balance in force in the differential mechanism 10, so that the torque may be transmitted from the rotating electrical machine 3 to the drive shaft 45.

The ECU 50 may appropriately switch the engine running operation and the EV running operation based on a requested drive power, a vehicle speed, or a charged state of a battery. Further, the engine running operation and the EV running operation may be switched based on the request of the user. Further, the ECU 50 may perform a regeneration operation by the rotating electrical machine 3 when the vehicle 100 is decelerated. For example, when a brake pedal is stepped on, the regeneration operation is performed, and hence a regenerative braking force may be generated.

Further, the ECU 50 may perform a speed shift control for the first transmission unit 20 and the second transmission unit 30. When the ECU 50 detects the target speed shift stage, the ECU 50 appropriately moves the sleeves 27, 28, and 29 in response to the target speed shift stage so as to connect the input shaft 6 to the gear corresponding to the target speed shift stage among the drive gears 21, 22, 23, 24, 25, and 26a. At this time, the ECU 50 transmits an engine torque or a motor torque to the driving wheel 46 through the sub-speed shift stage of the second transmission unit 30 while the speed shift stage of the first transmission unit 20 is switched from the current speed shift stage to the target speed shift stage. Furthermore, the target speed shift stage may selected based on the user's shift operation or may be automatically selected based on the running state.

For example, when the first speed shift stage is shifted up to the second speed shift stage in the first transmission unit 20, the ECU 50 forms the first speed shift stage in the second transmission unit 30 in advance. Accordingly, the torque may be transmitted to the driving wheel 46 through the second transmission unit 30 during the speed shift stage of the first transmission unit 20 is changed. Further, for example, when the fifth speed shift stage is shifted down to the fourth speed shift stage in the first transmission unit 20, the ECU 50 forms the fourth speed shift stage in the second transmission unit 30 in advance. Accordingly, the torque may be transmitted to the driving wheel 46 through the second transmission unit 30 during the first transmission unit 20 is shifted down. In this way, according to the vehicle driving device 1-1 of the embodiment, the losing of the torque during the speed shift operation is suppressed, and hence the drivability is improved.

The ECU 50 may further suppress a shift shock in the speed shift operation by the rotating electrical machine 3. For example, the shift shock may be suppressed by adjusting the rotation number of the input shaft 6 of the first transmission unit 20 or the rotation number of the input shaft 17 of the second transmission unit 30 based on the rotation number control of the rotating electrical machine 3 during the speed shift operation.

Here, when the rotating electrical machine 3, the first transmission unit 20, and the second transmission unit 30 are connected to the respective rotation components of the differential mechanism 10 and the first transmission unit 20 and the second transmission unit 30 are respectively connected to the drive shaft 45 as in the vehicle 100 of the embodiment, there is a case in which a power circulation occurs in the running state and hence the transmission efficiency is degraded as will be described later.

Figure 5:
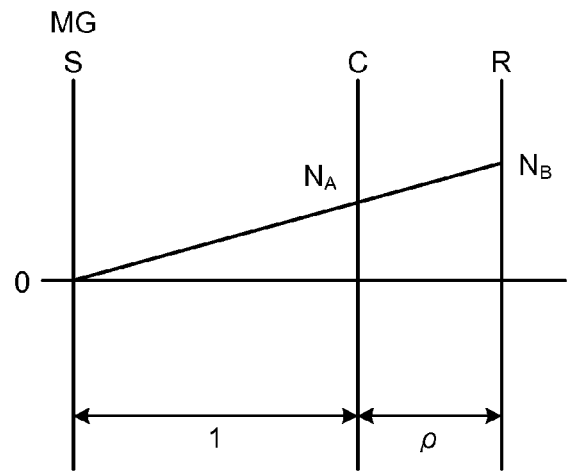
FIG. 5 is an alignment chart of a differential mechanism when the rotation number of a rotating electrical machine is 0.

FIG. 5 is an alignment chart for the differential mechanism 10 when the rotation number of the rotating electrical machine 3 is 0. In FIG. 5, the axis S indicates the rotation number of the sun gear 11 and the rotating electrical machine 3, the axis C indicates the rotation number of the carrier 14, and the axis R indicates the rotation number of the ring gear 13. The gear ratio (the number of the teeth of the sun gear 11/the number of the teeth of the ring gear 13) $\rho$ of the differential mechanism 10 may be set to, for example, 0.3.

On the assumption that the rotation number of the output shaft 19 is indicated by $N_E$, the gear ratio of the first transmission unit 20 is indicated by G1, and the gear ratio of the second transmission unit 30 is indicated by G2 when the vehicle runs at a certain vehicle speed, the rotation number $N_A$ of the input shaft 6 of the first transmission unit 20 is calculated by the following equation (1), and the rotation number $N_B$ of the input shaft 17 of the second transmission unit 30 is calculated by the following equation (2).

$$N_A = G1 \times N_E \quad (1)$$

$$N_B = G2 \times N_E \quad (2)$$

When the rotation number of the rotating electrical machine 3 becomes 0, the following equation (3) is established.

$$N_B = N_A \times (1+\rho) \quad (3)$$

On the assumption that a ratio (G2/G1) between the gear ratio G2 of the second transmission unit 30 and the gear ratio G1 of the first transmission unit 20 is indicated by $\gamma$, the following equation (4) is obtained from the equation (1), the equation (2), and the equation (3).

$$\gamma = G2/G1 = 1+\rho \quad (4)$$

Figure 6:
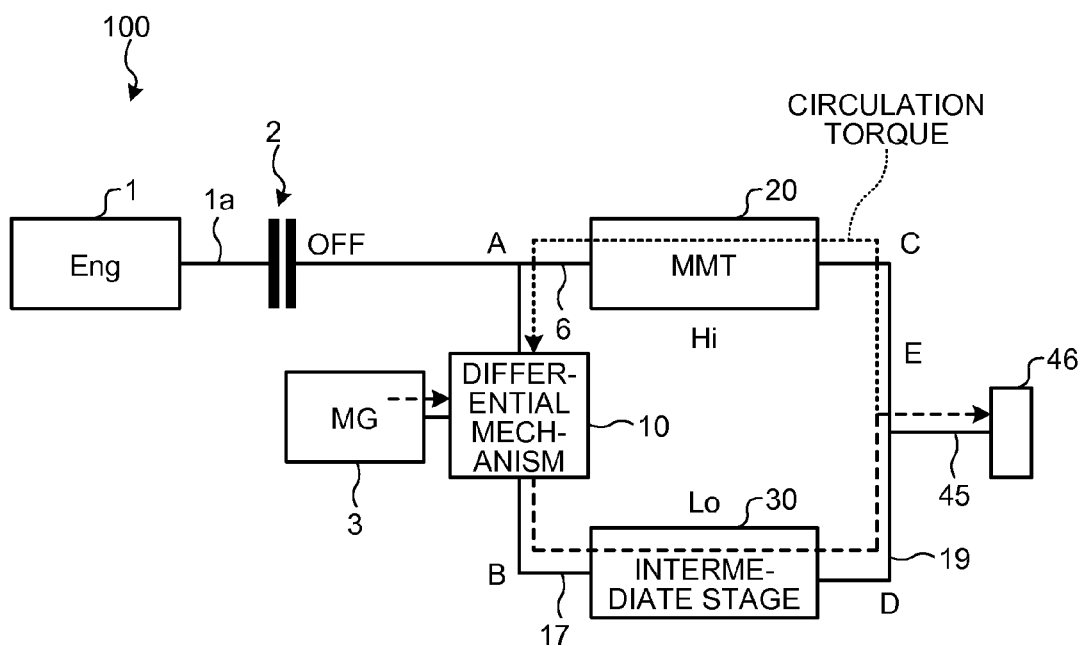
FIG. 6 is a diagram illustrating a power transmission state when a ratio $\gamma$ of gear ratios is larger than the value of $1+\rho$.
Figure 7:
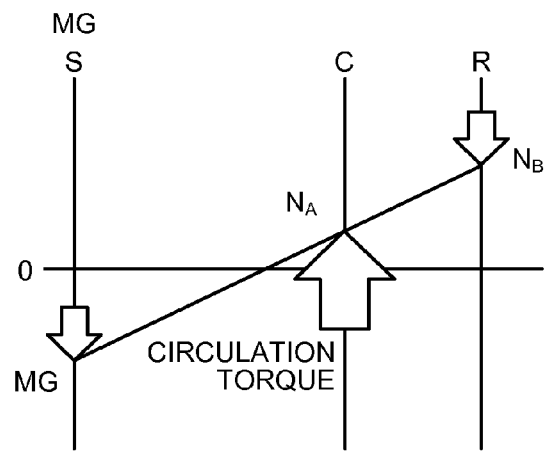
FIG. 7 is an alignment chart illustrating a state where the ratio $\gamma$ of gear ratios is larger than the value of $1+\rho$.
Figure 8:
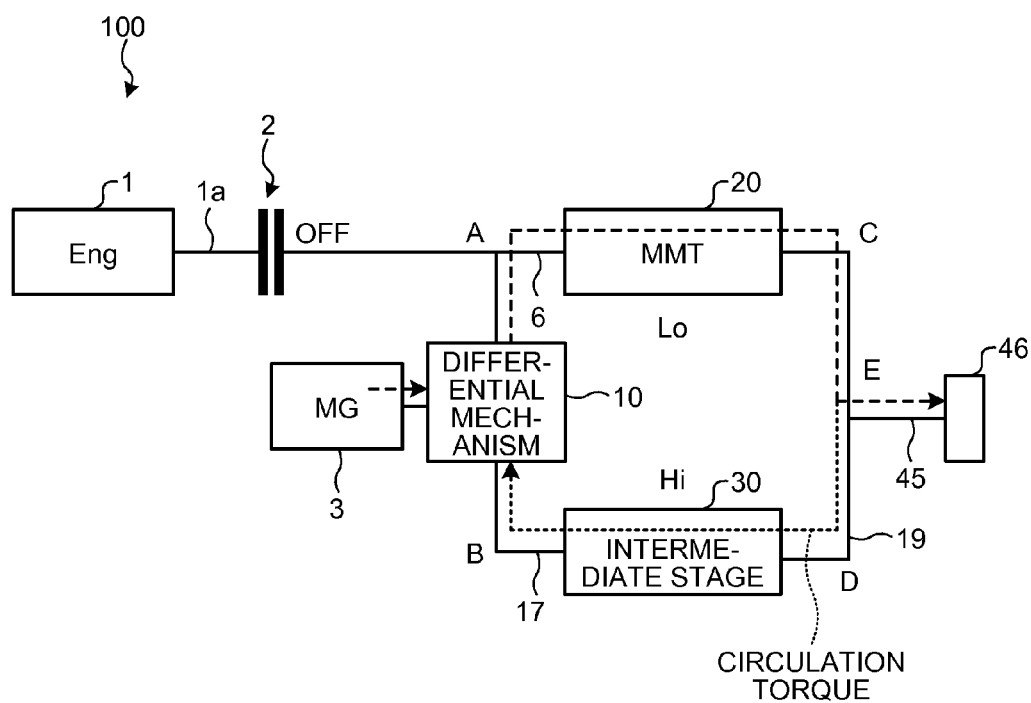
FIG. 8 is a diagram illustrating a power transmission state where the ratio $\gamma$ of gear ratios is smaller than the value of $1+\rho$.
Figure 9:
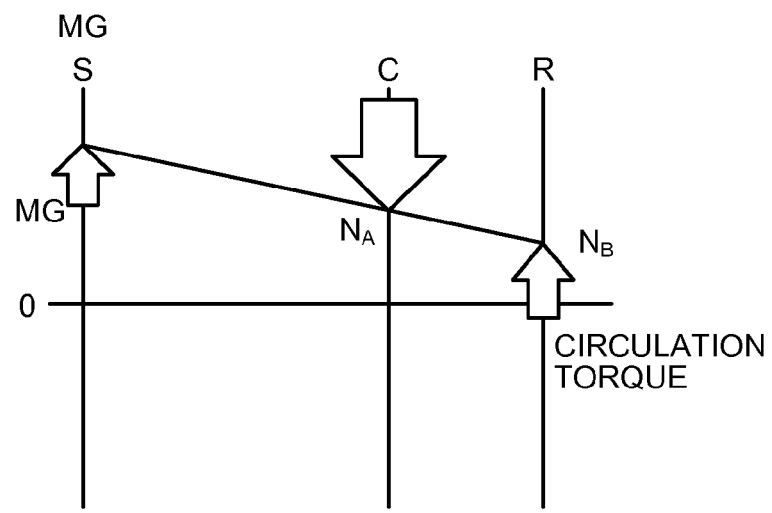
FIG. 9 is an alignment chart illustrating a state where the ratio γ of gear ratios is smaller than the value of 1+ρ.

When the first transmission unit 20 and the second transmission unit 30 respectively form the speed shift stages, the power direction is different between the rotating electrical machine 3 and the driving wheel 46 depending on whether the ratio $\gamma$ of gear ratios is larger or smaller than the value of $1+\rho$. FIG. 6 is a diagram illustrating a power transmission state when the ratio $\gamma$ of gear ratios is larger than the value of $1+\rho$, FIG. 7 is an alignment chart illustrating a state where the ratio $\gamma$ of gear ratios is larger than the value of $1+\rho$, FIG. 8 is a diagram illustrating a power transmission state when the ratio $\gamma$ of gear ratios is smaller than the value of $1+\rho$, and FIG. 9 is an alignment chart illustrating a state where the ratio $\gamma$ of gear ratios is smaller than the value of $1+\rho$. FIGS. 6 and 8 respectively illustrate the state of the vehicle 100 during the EV running operation. In the EV running operation, the clutch 2 is released, and the transmission of the power between the engine 1 and the rotating electrical machine 3, and the transmission units 20 and 30 is disconnected.

(Case of $\gamma > 1+\rho$)

When the ratio $\gamma$ of gear ratios is larger than the value of $1+\rho$, the torque (the motor torque) of the rotating electrical machine 3 is transmitted to the driving wheel 46 through the second transmission unit 30 and the drive shaft 45 as illustrated in FIG. 6. A part of the motor torque is transmitted from the output shaft 19 to the carrier 14 through the first transmission unit 20, so that the power circulation occurs.

Here, on the assumption that the magnitude of the torque of the input shaft 6 is indicated by $T_A$, the magnitude of the torque of the input shaft 17 is indicated by $T_B$, the magnitude of the torque (the torque of the part C of FIG. 28) output to the output shaft 19 through the speed shift stage of the first transmission unit 20 is indicated by $T_C$, the magnitude of the torque (the torque of the part D of FIG. 28) output to the output shaft 19 through the speed shift stage of the second transmission unit 30 is indicated by $T_D$, and the magnitude of the motor torque of the rotating electrical machine 3 is indicated by $T_{MG}$, the relations of the following equations (5), (6), (7), and (8) are established.

$$T_A = T_{MG} \times (1+\rho)/\rho \quad (5)$$

$$T_B = T_{MG} \times 1/\rho \quad (6)$$

$$T_C = T_A \times G1 \quad (7)$$

$$T_B = T_B \times G2 \quad (8)$$

The torque $T_0$ transmitted to the driving wheel 46 is calculated by the following equation (9). When the equations (5) to (8) are applied to the equation (9), the following equation (10) may be obtained. The equation (10) indicates a state where the gear ratio from the rotating electrical machine 3 to the driving wheel 46 is $1/\rho \times G2 - (1+\rho)/\rho \times G1$.

$$T_0 = T_D - T_C \quad (9)$$

$$T_0 = \{1/\rho \times G2 - (1+\rho)/\rho \times G1\} \times T_{MG} \quad (10)$$

Here, when the power circulation ratio $\delta$ is defined as $T_C/T_D$, the following equation (11) is obtained from the equations (5) to (8).

$$\delta = (1+\rho)/\gamma \quad (11)$$

(Case of $\gamma < 1+\rho$)

When the ratio $\gamma$ of gear ratios is smaller than the value of $1+\rho$, the motor torque is transmitted through the first transmission unit 20 and the drive shaft 45 to the driving wheel 46 as illustrated in FIG. 8. A part of the motor torque is transmitted to the ring gear 13 through the second transmission unit 30, so that the power circulation occurs. The torque $T_0$ transmitted to the driving wheel 46 is calculated by the following equation (12).

$$T_0 = T_C - T_D \quad (12)$$
$$= \{(1+\rho)/\rho \times G1 - 1/\rho \times G2\} \times T_{MG}$$

Further, the power circulation ratio $\delta$ is calculated by the following equation (13).

$$\delta = T_D/T_C = \gamma/(1+\rho) \quad (13)$$

Figure 10:
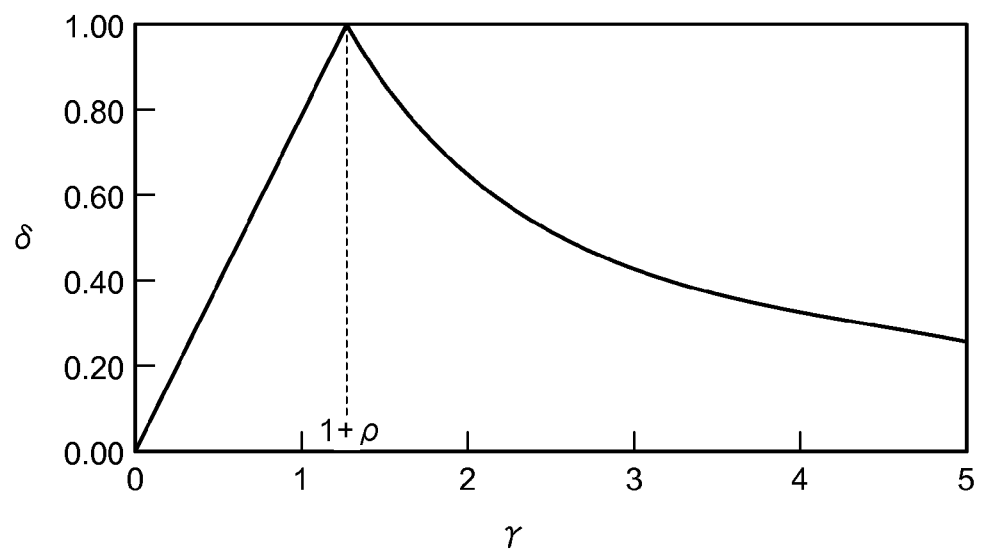
FIG. 10 is a diagram illustrating a relation between the ratio γ of gear ratios and a power circulation ratio 6.

From the equations (11) and (13), a relation between the ratio $\gamma$ of gear ratios and the power circulation ratio $\delta$ illustrated in FIG. 10 may be obtained. In FIG. 10, the horizontal axis indicates the ratio $\gamma$ of gear ratios, and the vertical axis indicates the power circulation ratio $\delta$. The power circulation ratio becomes 100% when the power circulation ratio $\delta$ is 1. This is the case where the ratio $\gamma$ of gear ratios=$1+\rho$ from the equations (11) and (13). The alignment chart at this time is depicted as illustrated in FIG. 5, and hence the power is not transmitted to the driving wheel 46. Furthermore, the flow of the power (in the EV powering operation) from the rotating electrical machine 3 to the driving wheel 46 in the power circulation has been described so far, but the power flow direction becomes opposite in the regeneration operation. However, the relation between the ratio $\gamma$ of gear ratios and the power circulation ratio $\delta$ does not change in the EV operation and the regeneration operation.

As illustrated in FIG. 10, the power circulation ratio $\delta$ becomes maximal when the ratio $\gamma$ of gear ratios is the value of $1+\rho$, and decreases as the ratio $\gamma$ of gear ratios is deviated from the value of $1+\rho$. Since the transmission efficiency becomes poor when the power circulation ratio $\delta$ is high, it is desirable to select the ratio $\gamma$ of gear ratios in which the power circulation ratio $\delta$ decreases as much as possible in the EV powering operation and the regeneration operation.

In the case of the EV running operation, if the vehicle runs by the combination of the main speed shift stage and the sub-speed shift stage in which the power circulation ratio $\delta$ becomes small value, a small power circulation ratio $\delta$ may be maintained without performing a speed shift operation when the powering operation is switched to the regeneration operation. For example, when a combination is selected in which the speed shift stage of the first transmission unit 20 is the fifth speed shift stage and the speed shift stage of the second transmission unit 30 is the second speed shift stage in the EV powering operation, the drivability during the start-up of the engine may be improved. Further, the ratio $\gamma$ of gear ratios is comparatively large, and the power circulation ratio $\delta$ is small. For this reason, degradation in transmission efficiency does not cause major problem in both the powering operation and the regeneration operation.

Figure 11:
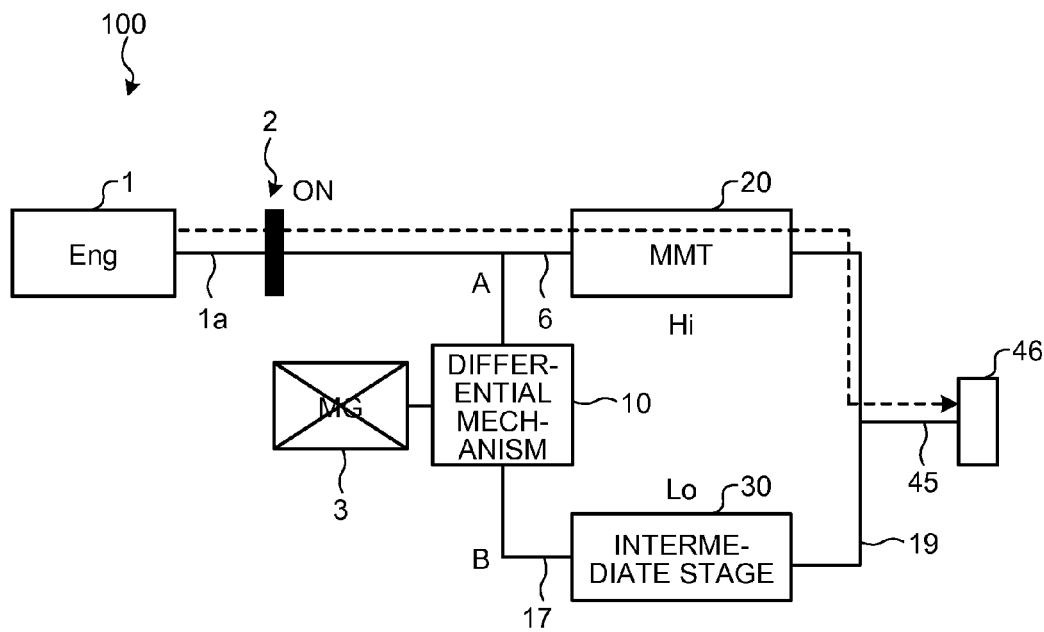
FIG. 11 is a diagram illustrating an engine running operation in a down-shift standby state.
Figure 12:
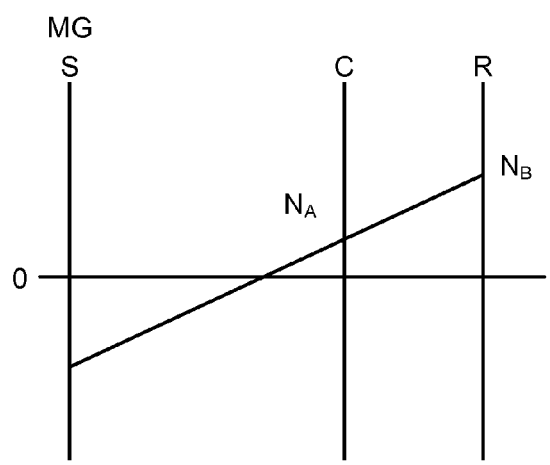
FIG. 12 is an alignment chart illustrating the engine running operation in the down-shift standby state.
Figure 13:
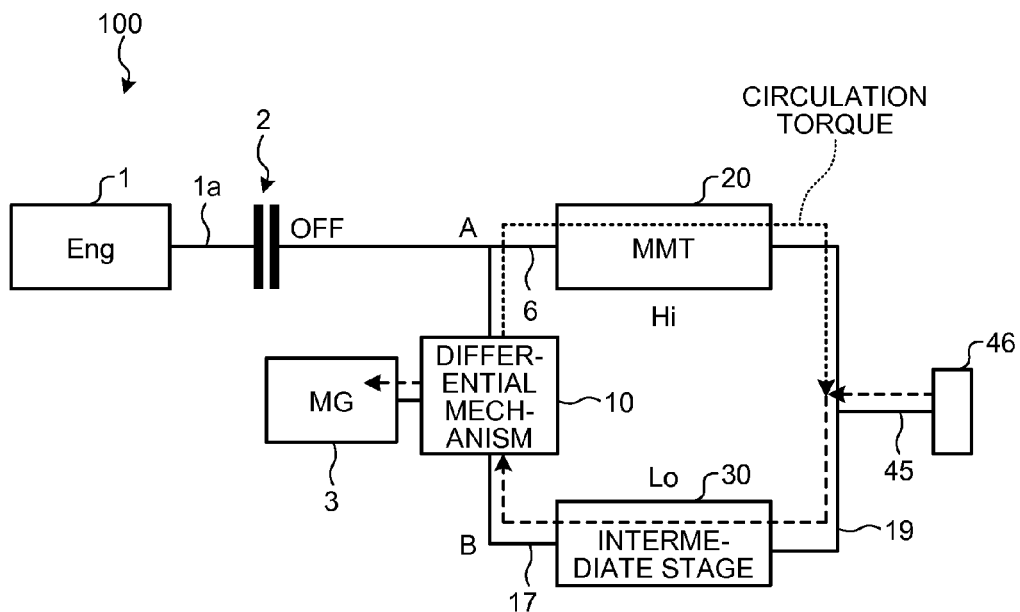
FIG. 13 is a diagram illustrating a power circulation during a regeneration operation.
Figure 14:
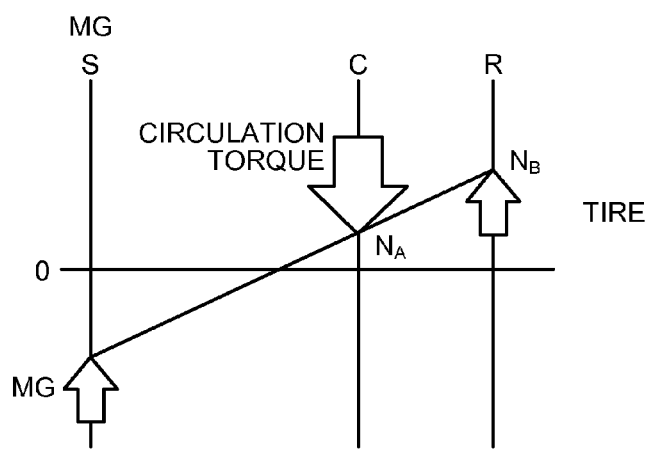
FIG. 14 is an alignment chart during a regeneration operation.

Meanwhile, the regeneration operation needs to be performed by the combination of the main speed shift stage and the sub-speed shift stage in which the power circulation ratio $\delta$ becomes large value in the regeneration operation from the engine running operation. FIG. 11 is a diagram illustrating the engine running operation in the down-shift standby state, FIG. 12 is an alignment chart for the engine running operation in the down-shift standby state, FIG. 13 is a diagram illustrating the power circulation during the regeneration operation, and FIG. 14 is an alignment chart for the regeneration operation.

As illustrated in FIG. 11, the clutch 2 is engaged during the engine running operation, and the vehicle 100 runs by using the engine 1 as a power source. During the engine running operation, the speed shift stage of the second transmission unit 30 is determined in response to whether the first transmission unit 20 is shifted up or down at the next time. When the up-shift of the first transmission unit 20 is estimated, the speed shift stage of the second transmission unit 30 is set to the speed shift stage which connects the speed shift stage of the first transmission unit 20 before the speed shift operation to the target speed shift stage. Here, the speed shift stage of the second transmission unit 30 is set to the speed shift stage of the first transmission unit 20 before the speed shift operation. For example, when the up-shift is estimated when the vehicle runs at the second speed shift stage of the first transmission unit 20, a standby time is spent at the second speed shift stage of the second transmission unit 30.

Meanwhile, when the down-shift of the first transmission unit 20 is estimated, the speed shift stage of the second transmission unit 30 is set to the speed shift stage which connects the speed shift stage of the first transmission unit 20 before the speed shift operation to the target speed shift stage. Here, the speed shift stage of the second transmission unit 30 is set to the speed shift stage which is lower by one level than the speed shift stage of the first transmission unit 20 before the speed shift operation. Accordingly, as illustrated in FIG. 11, in the down-shift standby state, the speed shift stage of the first transmission unit 20 becomes the speed shift stage which is higher than the speed shift stage of the second transmission unit 30. For example, when the down-shift is estimated when the vehicle runs at the second speed shift stage of the first transmission unit 20, a standby time is spent at the first speed shift stage of the second transmission unit 30. In this way, the ratio $\gamma$ of gear ratios changes depending on the running state. When the user steps on a brake in the standby state, there is a need to perform a regeneration operation at the ratio $\gamma$ of gear ratios at that time. When the regeneration operation is determined in the speed shift standby state by the combination of the main speed shift stage and the sub-speed shift stage in which the power circulation ratio $\delta$ is large and the regeneration operation is performed, the loss increases.

The vehicle driving device 1-1 according to the embodiment includes a predetermined mode in which the transmission of the power through the second shaft is disconnected and the differential operation of the differential mechanism 10 is regulated so that the rotating electrical machine 3 and the drive shaft 45 are connected to each other through the first shaft. In the predetermined mode of the embodiment, for example, the first transmission unit 20 corresponds to the first shaft, and the second transmission unit 30 corresponds to the second shaft. Furthermore, the input shaft 6 of the first transmission unit 20 or the input shaft 17 of the second transmission unit 30 may correspond to the first shaft or the second shaft.

In the embodiment, the first shaft and the second shaft are respectively the transmission units, but the invention is not limited thereto. The first shaft and the second shaft are shafts capable of transmitting a power, and may be used to connect the rotation component of the differential mechanism 10 and the drive shaft 45 of the vehicle 100 to each other. The second shaft includes a connection/disconnection mechanism capable of disconnecting the transmission of the power, and the transmission of the power through the second shaft is disconnected in the predetermined mode. The connection/disconnection mechanism of the embodiment includes the sleeves 35 and 36 and the drive gears 31, 32, 33, and 34 of the second transmission unit 30.

Figure 15:
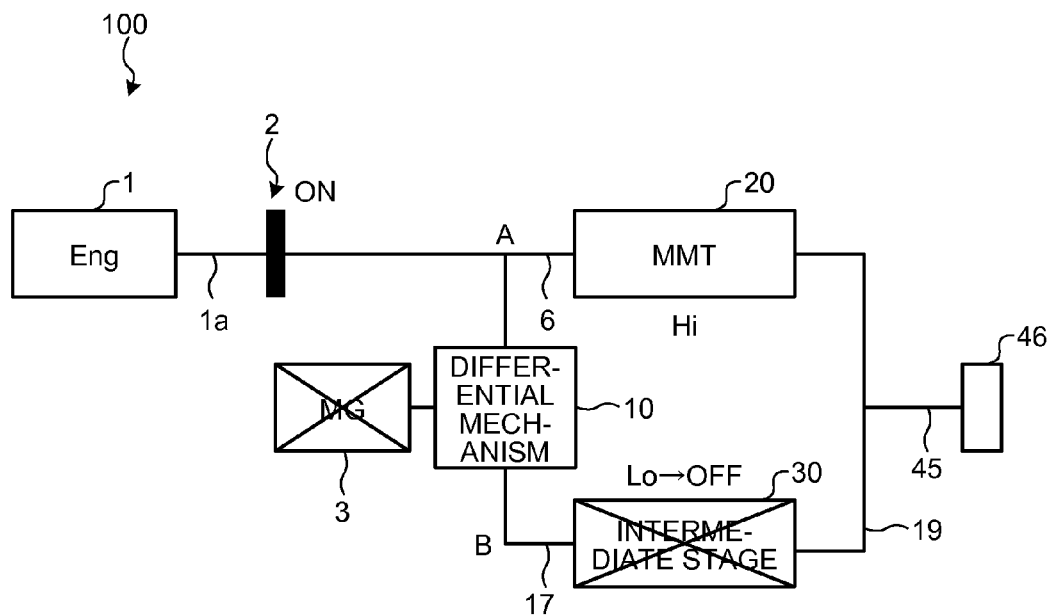
FIG. 15 is a diagram illustrating a case where a neutral state of a second transmission unit is selected.
Figure 16:
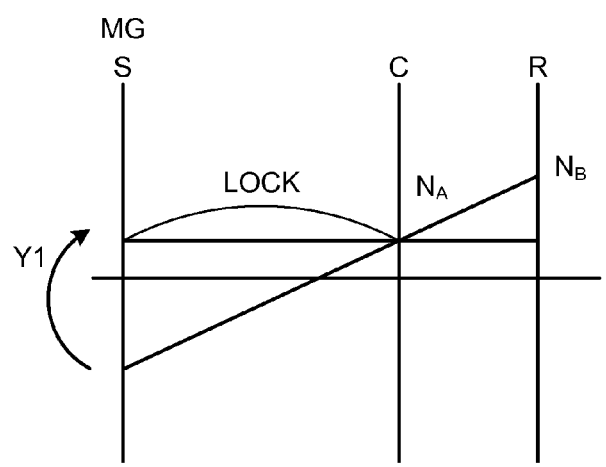
FIG. 16 is an alignment chart illustrating a rotation number control performed by a rotating electrical machine.
Figure 17:
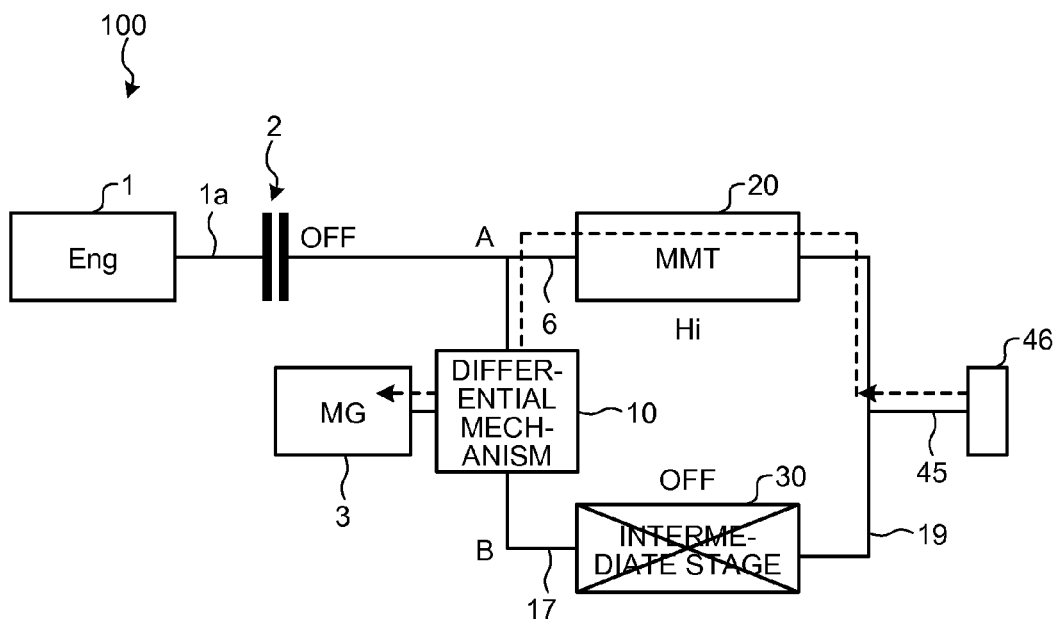
FIG. 17 is a diagram illustrating a regeneration operation performed by a predetermined mode.
Figure 18:
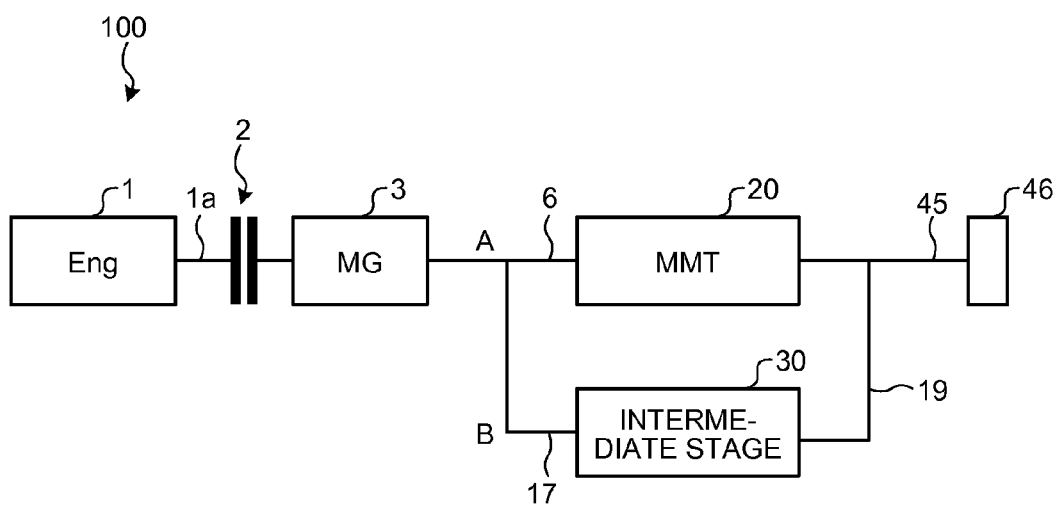
FIG. 18 is an equivalent diagram of a vehicle in a predetermined mode.
Figure 19:
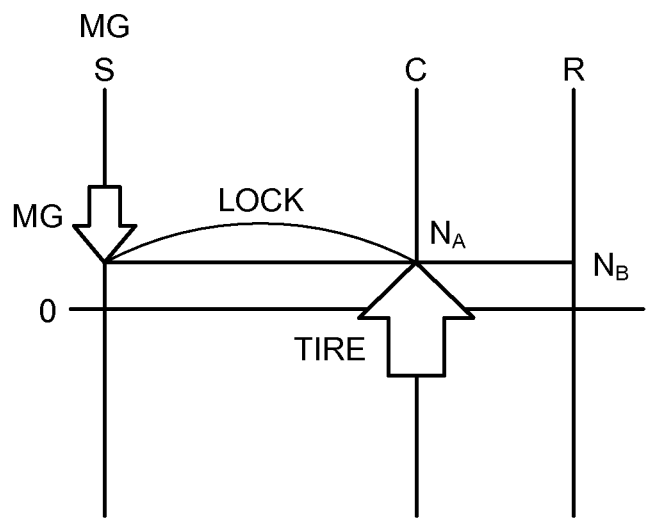
FIG. 19 is an alignment chart of a regeneration operation performed by a predetermined mode.

Referring to FIGS. 15 to 19, a running operation in a predetermined mode according to the embodiment will be described. FIG. 15 is a diagram illustrating a state where the neutral state of the second transmission unit 30 is selected, FIG. 16 is an alignment chart illustrating a rotation number control performed by the rotating electrical machine 3, FIG. 17 is a diagram illustrating a regeneration operation performed by the predetermined mode, FIG. 18 is an equivalent diagram of the vehicle 100 in the predetermined mode, and FIG. 19 is an alignment chart of the regeneration operation by the predetermined mode.

When the ECU 50 determines that the generation operation is performed in the down-shift standby state, the ECU 50 turns the second transmission unit 30 off so as to enter the neutral state as illustrated in FIG. 15. Accordingly, the transmission of the power through the second transmission unit 30 is disconnected.

Further, the ECU 50 synchronizes the rotation number $N_B$ of the input shaft 17 of the second transmission unit 30 with the rotation number $N_A$ of the input shaft 6 of the first transmission unit 20 by the rotation number control of the rotating electrical machine 3 as indicated by the arrow Y1 of FIG. 16. When the rotation number $N_B$ of the input shaft 17 is synchronized with the rotation number $N_A$ of the input shaft 6, the ECU 50 regulates the differential operation of the differential mechanism 10 by engaging the lock mechanism 40. Accordingly, the sun gear 11 is connected to the carrier 14, and the sun gear 11, the carrier 14, and the ring gear 13 rotate together in the differential mechanism 10. When the differential mechanism 10 is locked, the ECU 50 releases the clutch 2 and performs the regeneration operation by the rotating electrical machine 3 as illustrated in FIG. 17. During the regeneration operation, the engine 1 may be stopped.

When the differential operation of the differential mechanism 10 is locked, a drive system of the vehicle 100 is equivalent to the configuration illustrated in FIG. 18. That is, the rotating electrical machine 3, the input shaft 6 of the first transmission unit 20, and the input shaft 17 of the second transmission unit 30 are connected to one another. When any one of the first transmission unit 20 and the second transmission unit 30 enters the neutral state and the rotating electrical machine 3 and the drive shaft 45 are connected to each other through the other transmission unit while the differential operation of the differential mechanism 10 is locked, the power may be transmitted without causing the power circulation. In the embodiment, the second transmission unit 30 enters the neutral state. Since the second transmission unit 30 enters the neutral state, the power circulation does not occur, and a power is transmitted from the driving wheel 46 to the rotating electrical machine 3 through the first transmission unit 20 at high transmission efficiency. In the regeneration operation, the torque transmitted from the driving wheel 46 to the carrier 14 is balanced with the torque generated by the rotating electrical machine 3 due to the regeneration operation as illustrated in FIG. 19.

Furthermore, the predetermined mode may be set so that the first transmission unit 20 enters the neutral state instead of setting the second transmission unit 30 to the neutral state and the rotating electrical machine 3 and the drive shaft 45 are connected to each other through the second transmission unit 30. That is, the second transmission unit 30 may correspond to the first shaft, and the first transmission unit 20 may correspond to the second shaft.

Furthermore, some time is necessary for the modification from the engine running state illustrated in FIG. 11 to the regeneration state by the predetermined mode illustrated in FIG. 17. For this reason, it is desirable to perform a control so that the user does not feel uncomfortable in cooperation with a mechanical brake until the predetermined mode is performed. For example, if the regeneration operation is determined when the brake pedal is stepped on, a requested braking force is generated by a mechanical brake until the predetermined mode is performed. After the transition to the predetermined mode, the requested braking force may be generated by the braking force obtained by the mechanical brake and the braking force obtained by the regeneration operation. After the transition to the predetermined mode, all the braking force may be generated by the regeneration operation.

Further, the vehicle driving device 1-1 according to the embodiment may suppress the slow feeling or the losing of the torque when the EV reverse running operation is switched to the engine reverse running operation. In the vehicle 100 according to the embodiment, there is a need to perform the following operations when the EV reverse running operation is switched to the engine reverse running operation when the lock mechanism 40 is not provided.

Figure 20:
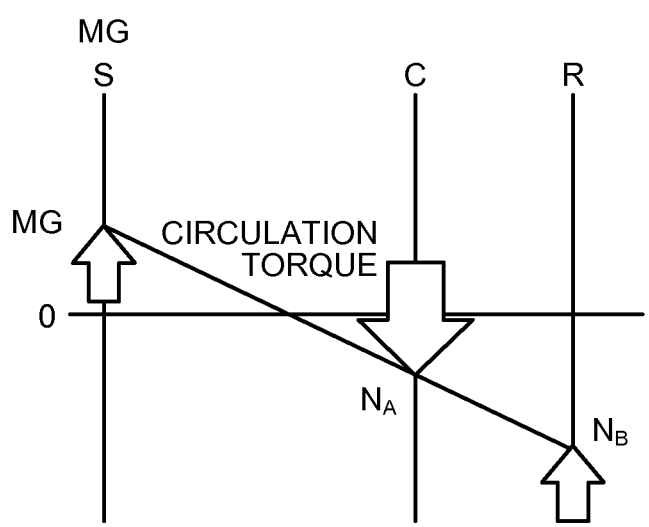
FIG. 20 is an alignment chart of an EV reverse running operation.
Figure 21:
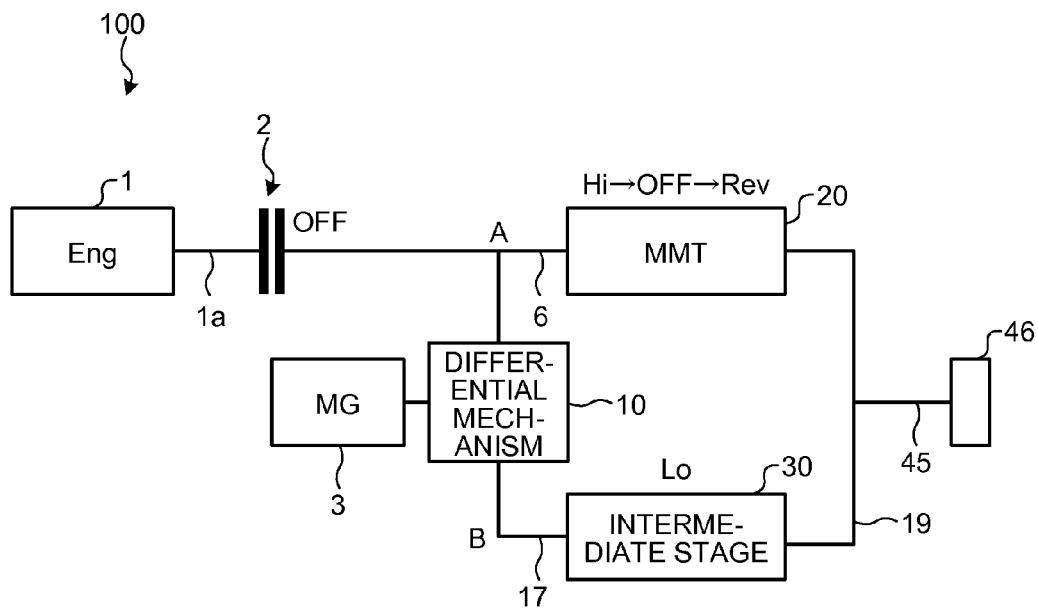
FIG. 21 is a diagram illustrating a procedure in which an EV reverse running operation is switched to an engine reverse running operation.
Figure 22:
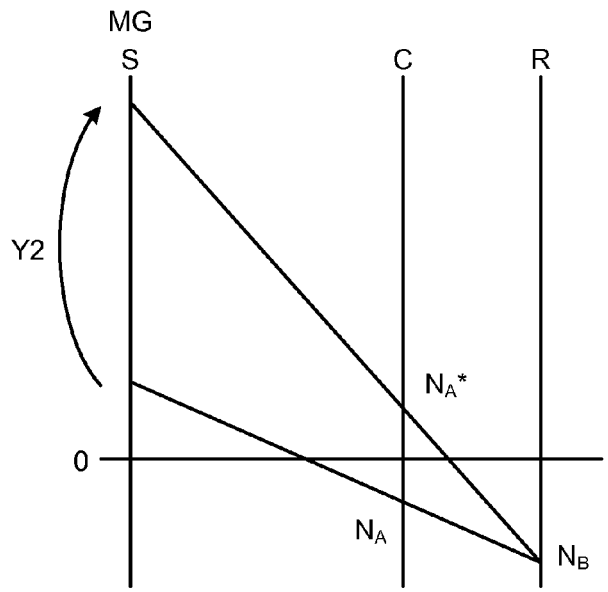
FIG. 22 is an alignment chart of a state where the EV reverse running operation is switched to the engine reverse running operation.
Figure 23:
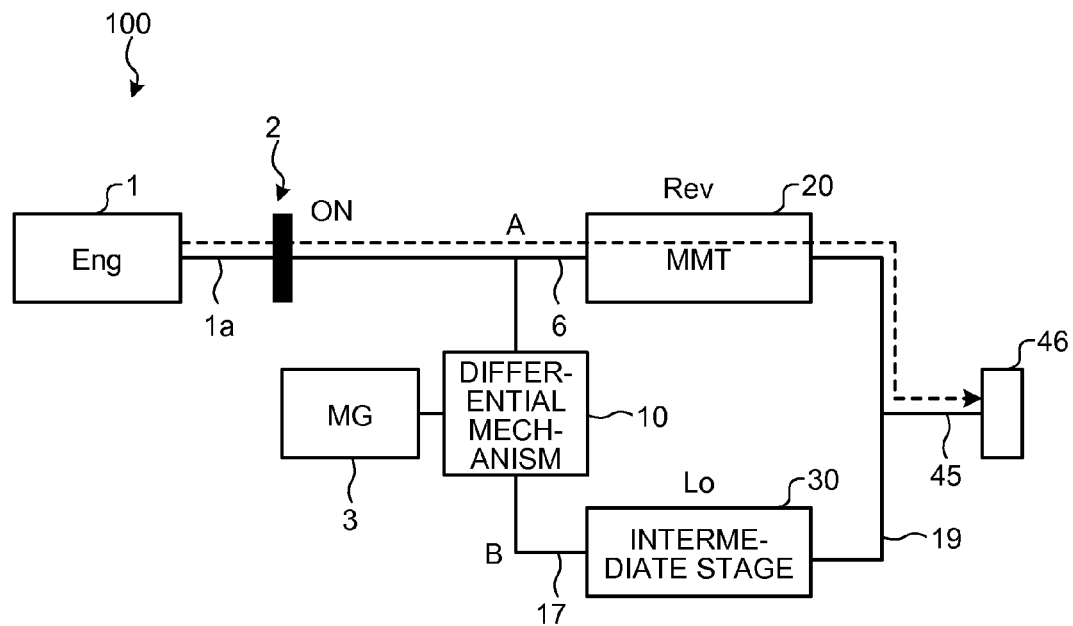
FIG. 23 is a diagram illustrating the engine reverse running operation.
Figure 24:
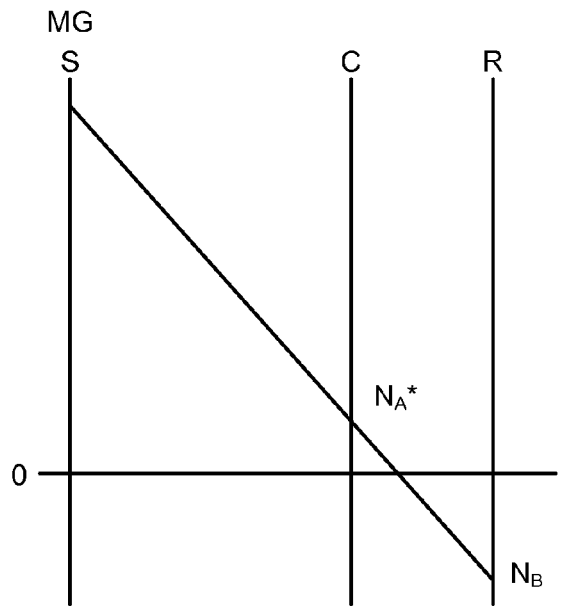
FIG. 24 is an alignment chart of the engine reverse running operation.

FIG. 20 is an alignment chart of the EV reverse running operation, FIG. 21 is a diagram illustrating a procedure in which the EV reverse running operation is switched to the engine reverse running operation, FIG. 22 is an alignment chart of the state where the EV reverse running operation is switched to the engine reverse running operation, FIG. 23 is a diagram illustrating the engine reverse running operation, and FIG. 24 is an alignment chart of the engine reverse running operation.

The EV reverse running operation is a running operation in which the vehicle 100 runs backward by using the rotating electrical machine 3 as a power source. In the EV reverse running operation, the vehicle 100 may move backward by setting, for example, the rotation direction and the torque of the rotating electrical machine 3 to be opposite to those of the EV forward running operation. As illustrated in FIG. 20, the rotating electrical machine 3 may rotate the input shaft 6 and the input shaft 17 in the reverse direction while being rotated in the normal direction by the powering operation using a positive torque. The combination of the speed shift stage of the first transmission unit 20 and the speed shift stage of the second transmission unit 30 may be set to, for example, the fifth speed shift stage and the second speed shift stage.

The engine reverse running operation is a running operation in which the vehicle 100 runs backward by using the engine 1 as a power source. In the engine reverse running operation, the speed shift stage of the first transmission unit 20 needs to be set to the reverse running speed shift stage. For this reason, the ECU 50 sets the motor torque to 0 and sets the first transmission unit 20 to the neutral state as illustrated in FIG. 21. Next, the ECU 50 changes the rotation number $N_A$ of the input shaft 6 of the first transmission unit 20 to the rotation number $N_A^*$ synchronized with the reverse running speed shift stage as indicated by the arrow Y2 of FIG. 22. The rotation number is adjusted by the rotating electrical machine 3. When the rotation number is adjusted, the ECU 50 switches the speed shift stage of the first transmission unit 20 to the reverse running speed shift stage.

Next, the ECU 50 starts the engine 1 by a starter and engages the clutch 2. Accordingly, the engine reverse running operation illustrated in FIG. 23 is realized. In this way, in order to switch the EV reverse running operation to the engine reverse running operation, the speed shift operation of the first transmission unit 20 and the adjustment of the rotation number is needed, and a period in which the motor torque becomes 0 occurs. For this reason, there is a concern that the drivability may be degraded due to the slow feeling or the losing of the torque.

As a method of suppressing the slow feeling or the losing of the torque, a method of using the reverse running speed shift stage even in the EV reverse running operation may be considered. However, in this case, there is a need to dispose a reverse running gear not only in the first transmission unit 20, but also the second transmission unit 30. This is because the balance of the force is not established in the differential mechanism 10 and the motor torque may not be transmitted unless both the first transmission unit 20 and the second transmission unit 30 are set to the reverse running gears. When two pairs of reverse running gears are provided, an increase in cost occurs.

Figure 25:
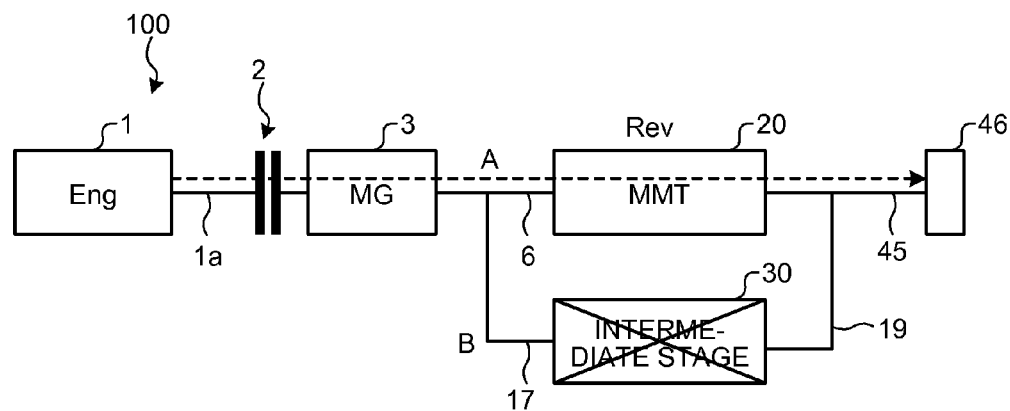
FIG. 25 is a diagram illustrating a reverse running operation by a predetermined mode.

On the contrary, the vehicle driving device 1-1 according to the embodiment sets a predetermined mode when the vehicle 100 runs backward and causes the vehicle 100 to run backward in the predetermined mode. FIG. 25 is a diagram illustrating a state where the vehicle runs backward by the predetermined mode. As illustrated in FIG. 25, in the case where the vehicle runs backward, the differential mechanism 10 is locked by the lock mechanism 40, the first transmission unit 20 is set to the reverse running speed shift stage, and the second transmission unit 30 is set to the neutral state. Accordingly, in the EV reverse running operation, the clutch 2 is released, and hence the vehicle 100 runs backward by using the rotating electrical machine 3 as a power source. In the engine reverse running operation, the clutch 2 is engaged, and hence the vehicle 100 may run backward by using the engine 1 as a power source. That is, the EV reverse running operation and the engine reverse running operation may be switched to each other without the change of the speed shift stage and the rotation number control.

For example, when the EV reverse running operation is switched to the engine reverse running operation, the engine 1 is started by a starter and the clutch 2 is engaged after the start-up, thereby smoothly switching the current operation to the engine reverse running operation. Further, since the second transmission unit 30 is set to the neutral state when the vehicle runs backward, the second transmission unit 30 does not need to be provided with the reverse running speed shift stage. Since a pair of reverse running speed shift stages is provided only in the first transmission unit 20, a decrease in cost is realized. Further, since the power circulation does not occur, degradation in transmission efficiency is suppressed.

Furthermore, in the embodiment, the planetary gear mechanism is used as the differential mechanism 10, but the invention is not limited thereto. For example, the other known differential mechanism may be used. Further, the other known transmission mechanisms may be used as the transmission units 20 and 30. Further, the predetermined mode may be performed in the case other than the exemplary case disclosed in the embodiment.

Further, the connection configuration for the rotating electrical machine 3, the first transmission unit 20, and the second transmission unit 30 and the differential mechanism 10 is not limited to the exemplary configuration. For example, the correspondence relation of any one of the rotating electrical machine 3, the first transmission unit 20, and the second transmission unit 30 with respect to the sun gear 11, the carrier 14, and the ring gear 13 may be appropriately set.

First Modified Example of Embodiment

Figure 26:
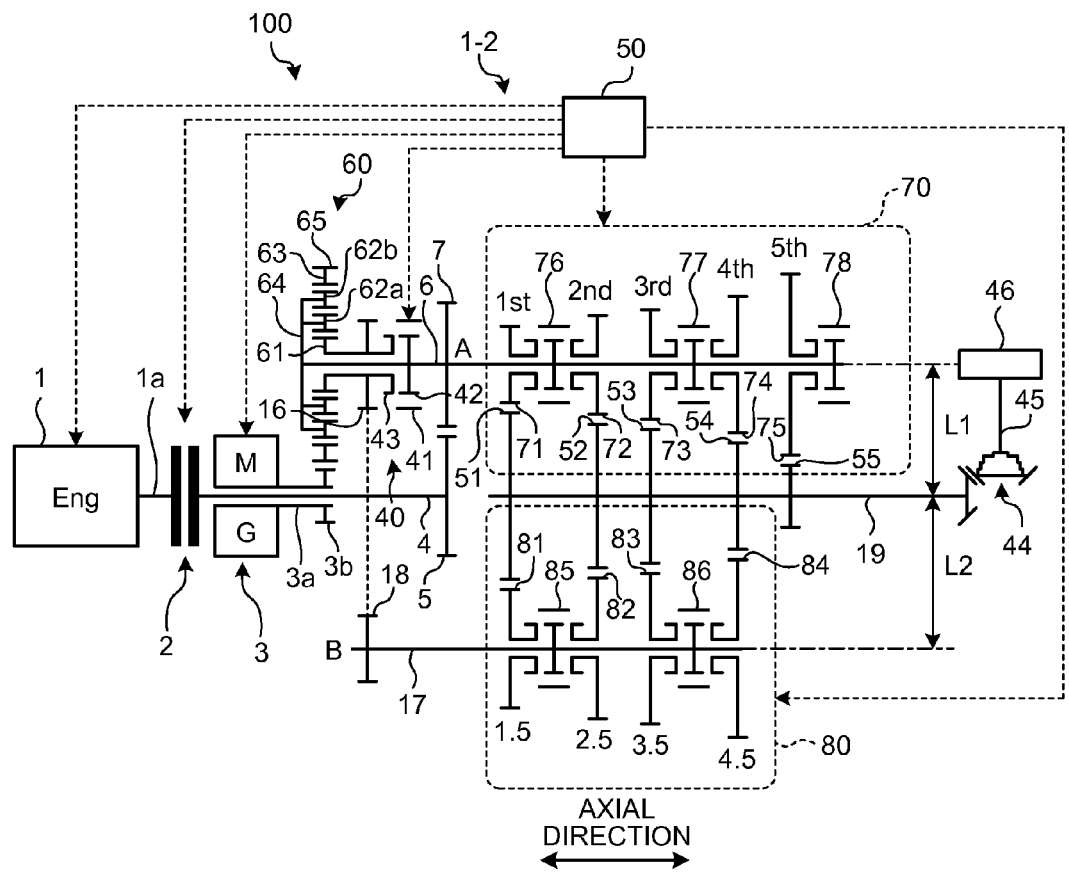
FIG. 26 is a skeleton diagram of a vehicle according to a first modified example of the embodiment.

A first modified example of the embodiment will be described. FIG. 26 is a skeleton diagram of the vehicle 100 according to the first modified example. A vehicle driving device 1-2 according to the modified example is different from the vehicle driving device 1-1 of the above-described embodiment in that a double pinion type differential mechanism 60 is provided. In the vehicle driving device 1-2 according to the modified example, the reverse running speed shift stage is not needed.

The differential mechanism 60 is disposed so as to be coaxial with the input shaft 6 of a first transmission unit 70. The differential mechanism 60, the lock mechanism 40, the driven gear 7, a drive gear 71, a sleeve 76, drive gears 72 and 73, a sleeve 77, drive gears 74 and 75, and a sleeve 78 are disposed in this order from the engine 1 in the input shaft 6.

The differential mechanism 60 includes a sun gear 61, a first pinion gear 62a, a second pinion gear 62b, a ring gear 63, and a carrier 64. The ring gear 63 is disposed at the outside of the sun gear 61 in the radial direction so as to be coaxial with the sun gear 61. The first pinion gear 62a and the second pinion gear 62b are disposed between the sun gear 61 and the ring gear 63. The first pinion gear 62a meshes with the sun gear 61 and the second pinion gear 62b. The second pinion gear 62b meshes with the first pinion gear 62a and the ring gear 63. The first pinion gear 62a and the second pinion gear 62b are rotatably supported by the carrier 64.

The sun gear 61 is supported so as to be rotatable with respect to the input shaft 6 while being coaxial with the input shaft 6. The rotation shaft of the sun gear 61 is provided with the drive gear 16. The drive gear 16 meshes with the driven gear 18 disposed in the input shaft 17 of a second transmission unit 80. The gear ratio between the drive gear 16 and the driven gear 18 is 1. Thus, the input shaft 17 rotates in a direction opposite to the rotation direction of the sun gear 61 at the same speed as the sun gear 61.

The carrier 64 is connected to the input shaft 6, and rotates along with the input shaft 6. Thus, the first pinion gear 62a may rotate (revolve) about the center axis of the input shaft 6 along with the carrier 64, and may rotate (spin) about the center axis of the first pinion gear 62a while being supported by the carrier 64. Further, the second pinion gear 62b may rotate (revolve) about the center axis of the input shaft 6 along with the carrier 64, and may rotate (spin) about the center axis of the second pinion gear 62b while being supported by the carrier 64.

The outer peripheral surface of the ring gear 63 is provided with an input gear 65. The input gear 65 meshes with an output gear 3b provided in the rotation shaft 3a of the rotating electrical machine 3. The rotating electrical machine 3 outputs a torque by consuming an electrical power during a powering operation, and may rotationally drive the input gear 65 by the output torque. Further, the rotating electrical machine 3 generates an electrical power while being rotationally driven by the torque transmitted from the input gear 65 to the output gear 3b during the regeneration operation, and may exert a load torque generated in response to the generation load on the input gear 65.

The lock mechanism 40 has a function of regulating the relative rotation between the sun gear 61 and the carrier 64 of the differential mechanism 60. The lock mechanism 40 is, for example, an meshing type dog clutch similar to the lock mechanism 40 of the above-described embodiment. The lock mechanism 40 includes the sleeve 41, the dog tooth 42 which is connected to the input shaft 6, and the dog tooth 43 which is connected to the sun gear 61. The lock mechanism 40 is switched between the engagement state and the release state by driving the sleeve 41 by an actuator (not illustrated) so as to move in the axial direction.

The engaged lock mechanism 40 locks the relative rotation between the sun gear 61 and the carrier 64, and hence locks the differential mechanism 60 so that the differential operation can not be performed. On the contrary, the released lock mechanism 40 allows the relative rotation between the sun gear 61 and the carrier 64, and hence allows the differential operation of the differential mechanism 60. Furthermore, the combination of the rotation components engaged by the lock mechanism 40 is not limited to the sun gear 61 and the carrier 64. The lock mechanism 40 may engage any two or more rotation components of the sun gear 61, the ring gear 63, and the carrier 64 of the differential mechanism 60 so as to regulate the differential operation thereof.

The first transmission unit 70 includes the drive gears 71, 72, 73, 74, and 75 of respective speeds instead of the drive gears 21, 22, 23, 24, and 25 of the first transmission unit 20 of the above-described embodiment. Further, the first transmission unit 70 includes the sleeves 76, 77, and 78 instead of the sleeves 27, 28, and 29 of the first transmission unit 20 of the above-described embodiment. Furthermore, the first transmission unit 70 does not include the reverse running speed shift stage differently from the first transmission unit 20 of the above-described embodiment.

The first transmission unit 70 may connect any one of the drive gears 71, 72, 73, 74, and 75 to the input shaft 6 by driving the sleeves 76, 77, and 78 by the actuator so as to move in the axial direction. Accordingly, the input shaft 6 is connected to the output shaft 19 through any pair of gears from the first speed to the fifth speed, and hence the rotation may be transmitted at the gear ratio of the pair of gears. Further, the first transmission unit 70 may enter the neutral state by releasing all drive gears 71, 72, 73, 74, and 75 with the movement of the sleeves 76, 77, and 78 in the axial direction. The first transmission unit 70 in the neutral state disconnects the transmission of the power between the input shaft 6 and the output shaft 19.

The second transmission unit 80 includes drive gears 81, 82, 83, and 84 of respective speeds, sleeves 85 and 86, and driven gears 51, 52, 53, and 54 of respective speeds. The drive gears 81, 82, 83, and 84 are respectively supported so as to be rotatable with respect to the input shaft 17. The second transmission unit 80 is a transmission unit of an intermediate stage, and may transmit a rotation at the intermediate gear ratio with respect to the gear ratio of the respective speeds of the first transmission unit 70. The center axis distance L2 between the output shaft 19 and the input shaft 17 is larger than the center axis distance L1 between the output shaft 19 and the input shaft 6. Since the first transmission unit 70 and the second transmission unit 80 share the driven gears 51, 52, 53, and 54, the gear ratio of the speed shift stage of the second transmission unit 80 is smaller than the gear ratio of the speed shift stage of the first transmission unit 70 corresponding to the common driven gears 51, 52, 53, and 54.

The drive gear 81 and the driven gear 51 make a pair of meshing gears of a first-half speed shift stage, and realize the gear ratio between the first speed and the second speed of the first transmission unit 70. For example, middle gear ratio between the first speed and the second speed is realized. The drive gear 82 and the driven gear 52 make a pair of meshing gears of a second-half speed shift stage, and realize the gear ratio between the second speed and the third speed of the first transmission unit 70. For example, middle gear ratio between the second speed and the third speed is realized. The drive gear 83 and the driven gear 53 make a pair of meshing gears of a third-half speed shift stage, and realize the gear ratio between the third speed and the fourth speed of the first transmission unit 70. For example, middle gear ratio between the third speed and the fourth speed is realized. The drive gear 84 and the driven gear 54 make a pair of meshing gears of a fourth-half speed shift stage, and realize the gear ratio between the fourth speed and the fifth speed of the first transmission unit 70. For example, middle gear ratio between the fourth speed and the fifth speed is realized.

The second transmission unit 80 may connect any one of the drive gears 81, 82, 83, and 84 to the input shaft 17 by driving the sleeves 85 and 86 by the actuator so as to move in the axial direction. Accordingly, the input shaft 17 is connected to the output shaft 19 through any pair of gears from the first-half speed to the fourth-half speed, and hence the rotation may be transmitted at the gear ratio of the pair of gears. Further, the second transmission unit 80 may enter the neutral state by releasing all drive gears 81, 82, 83, and 84 with the movement of the sleeves 85 and 86 in the axial direction. The second transmission unit 80 in the neutral state disconnects the transmission of the power between the input shaft 17 and the output shaft 19.

The first transmission unit 70 and the second transmission unit 80 are connected to the drive shaft 45 of the vehicle 100 through the common output shaft 19. In the modified example, the first transmission unit 70 has a function as a main transmission and the second transmission unit 80 has a function as a sub-transmission. In the first transmission unit 70 and the second transmission unit 80, the change of the speed shift stage and the engagement/release of the clutch 2 are automatically controlled. The second transmission unit 80 according to the modified example has a function of transmitting the engine torque to the driving wheel 46 when the vehicle runs backward in addition to the function of the second transmission unit 30 of the above-described embodiment.

The ECU 50 sets the speed shift stage of the second transmission unit 80 to the speed shift stage between the speed shift stage of the first transmission unit 70 before the gear-shift operation and the target speed shift stage when the gear-shift operation of the first transmission unit 70 is performed. For example, when the first speed shift stage is shifted up to the second speed shift stage in the first transmission unit 70, the first-half speed shift stage is formed in the second transmission unit 80 in advance. Accordingly, the torque may be transmitted to the driving wheel 46 through the second transmission unit 80 while the speed shift stage of the first transmission unit 70 is changed. Further, the ECU 50 forms the fourth-half speed shift stage in the second transmission unit 80 in advance, for example, when the fifth speed shift stage is shifted down to the fourth speed shift stage in the first transmission unit 70. Accordingly, the torque may be transmitted to the driving wheel 46 through the second transmission unit 80 during the first transmission unit 70 is shifted down.

Further, the gear ratio of the second transmission unit 80 is set to middle gear ratio between the gear ratio of the first transmission unit 70 before the gear-shift operation and the gear ratio after the gear-shift operation. Accordingly, a variation in torque or a variation in rotation is suppressed during the gear-shift operation. The ECU 50 may further suppress the shift shock during the gear-shift operation by the rotating electrical machine 3. For example, the shift shock may be suppressed by adjusting the rotation number of the input shaft 6 of the first transmission unit 70 or the rotation number of the input shaft 17 of the second transmission unit 80 using the rotation number control of the rotating electrical machine 3 during the gear-shift operation.

Figure 27:
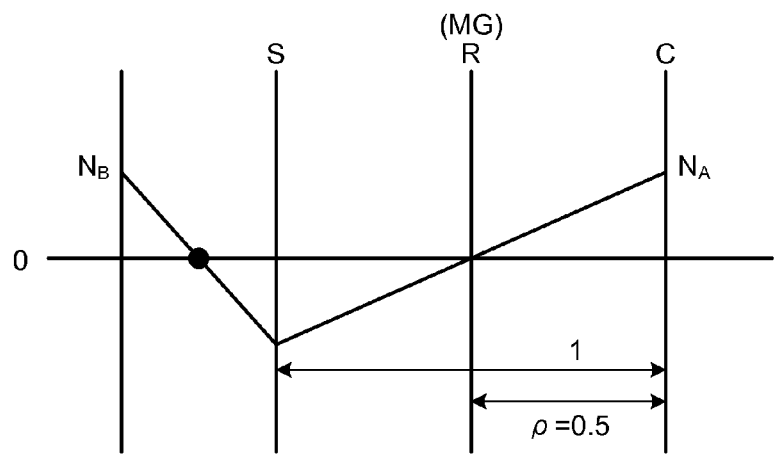
FIG. 27 is an alignment chart of a differential mechanism when the rotation number of a rotating electrical machine is 0.

Here, the transmission efficiency and the power circulation occurring in the vehicle driving device 1-2 according to the modified example will be described. FIG. 27 is an alignment chart of the differential mechanism 60 when the rotation number of the rotating electrical machine 3 is 0. In FIG. 27, the leftmost vertical axis indicates the rotation number of the input shaft 17 of the second transmission unit 80, the axis S indicates the rotation number of the sun gear 61, the axis R indicates the rotation number of the ring gear 63, and the axis C indicates the rotation number of the carrier 64. The gear ratio (the number of the teeth of the sun gear 61/the number of the teeth of the ring gear 63) $\rho$ of the differential mechanism 60 is set to, for example, 0.5.

The rotation number of the rotating electrical machine 3 becomes 0 when the rotation number of the ring gear 63 becomes 0. The relation between the rotation number $N_A$ of the input shaft 6 and the rotation number $N_B$ of the input shaft 17 at this time is obtained by the following equation (14).

$$N_A = N_B \quad (14)$$

When the ratio of gear ratios G2/G1 is indicated by $\gamma$, the following equation (15) is obtained from the equation (1), the equation (2), and the equation (14). That is, the rotation number of the rotating electrical machine 3 becomes 0 when the ratio $\gamma$ of gear ratios is 1.

$$\gamma = 1 \quad (15)$$

Figure 28:
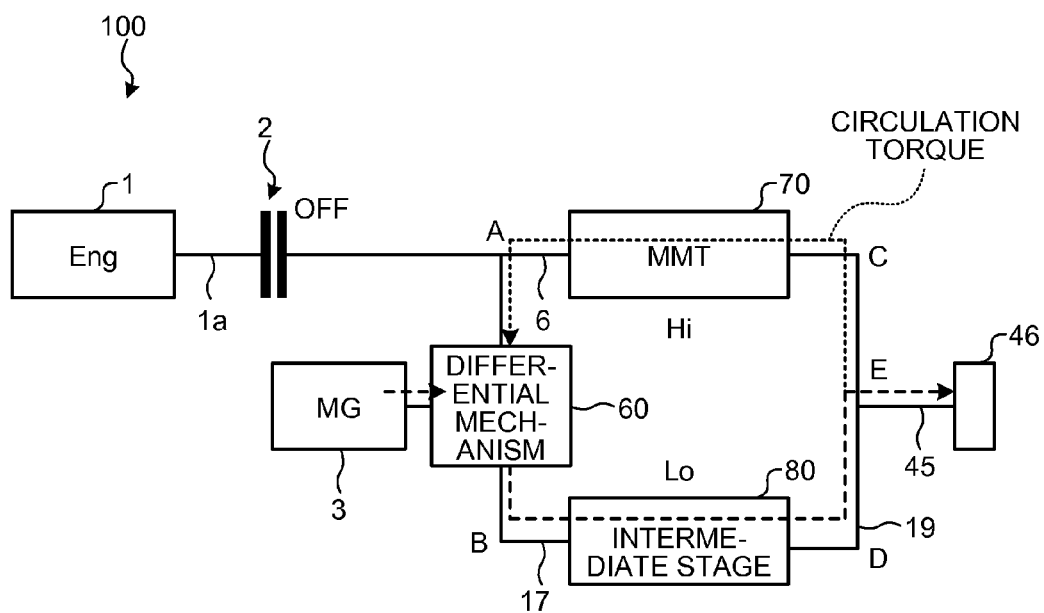
FIG. 28 is a diagram illustrating a power transmission state where the ratio γ of gear ratios is larger than 1.
Figure 29:
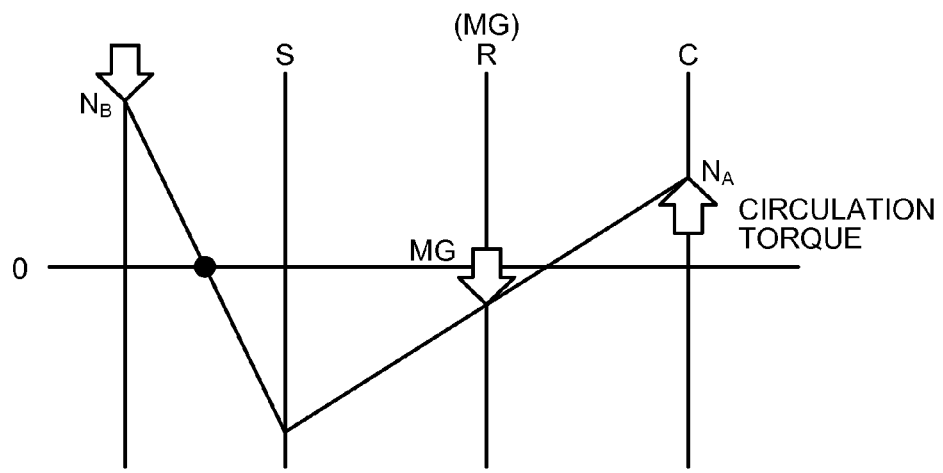
FIG. 29 is an alignment chart illustrating a state where the ratio γ of gear ratios is larger than 1.
Figure 30:
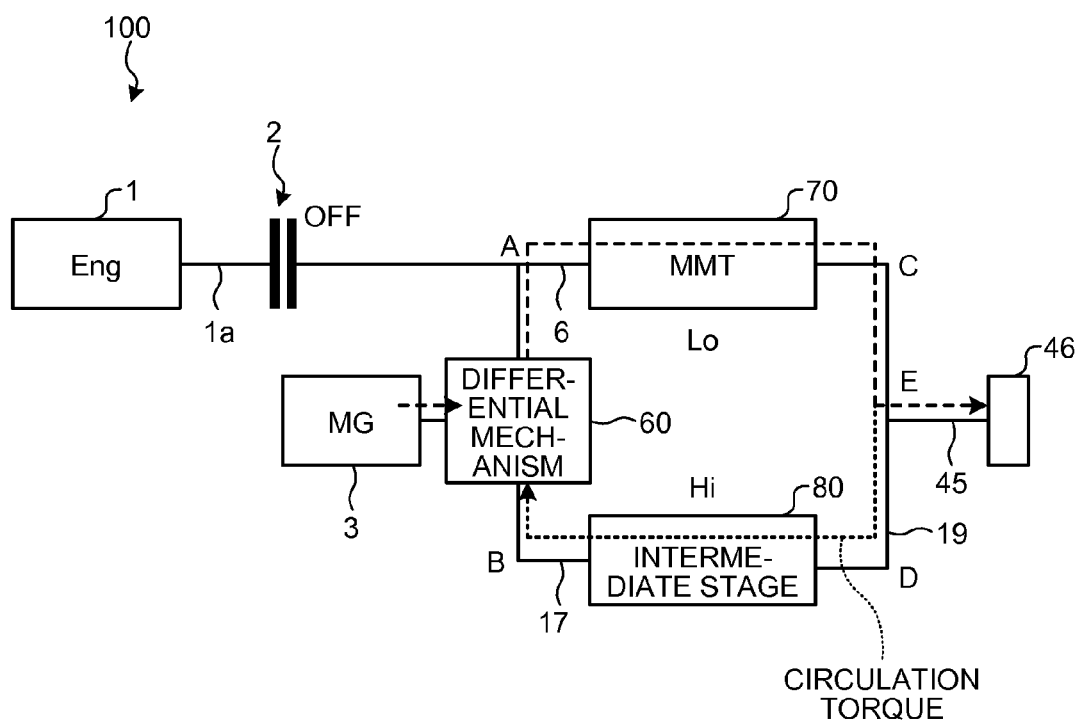
FIG. 30 is a diagram illustrating a power transmission state where the ratio γ of gear ratios is smaller than 1.
Figure 31:
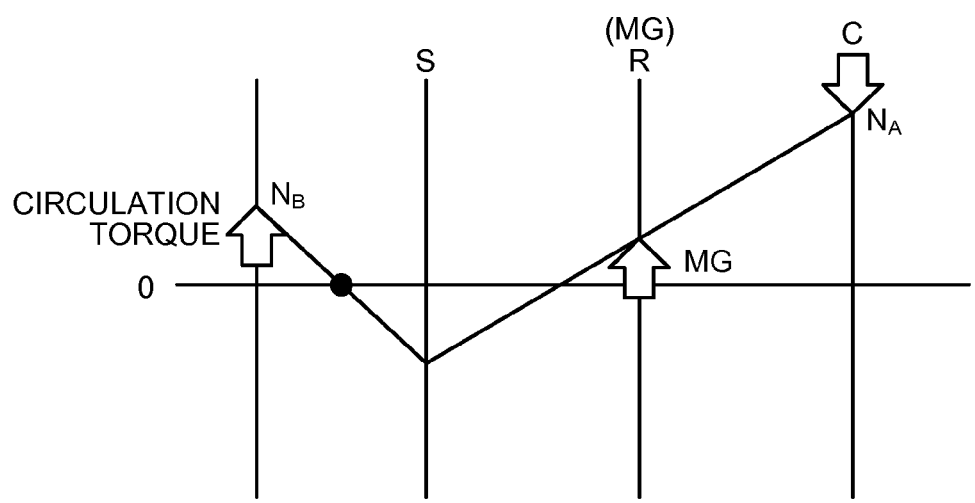
FIG. 31 is an alignment chart illustrating a state where the ratio γ of gear ratios is smaller than 1.

The cases where the ratio $\gamma$ of gear ratios is larger than 1 and the case where the ratio $\gamma$ of gear ratios is smaller than 1 are different in the power transmission path from the rotating electrical machine 3 to the driving wheel 46, that is, the torque transmission direction is different. FIG. 28 is a diagram illustrating a power transmission state where the ratio $\gamma$ of gear ratios is larger than 1, FIG. 29 is an alignment chart illustrating a state where the ratio $\gamma$ of gear ratios is larger than 1, FIG. 30 is a power transmission state where the ratio $\gamma$ of gear ratios is smaller than 1, and FIG. 31 is an alignment chart illustrating a state where the ratio $\gamma$ of gear ratios is smaller than 1.

(Case of Ratio $\gamma$ of Gear Ratios>1)

As illustrated in FIG. 28, when the ratio $\gamma$ of gear ratios is larger than 1, the torque (the motor torque) of the rotating electrical machine 3 is transmitted through the second transmission unit 80 and the drive shaft 45 to the driving wheel 46. A part of the motor torque is transmitted to the carrier 64 through the first transmission unit 70, and hence the power circulation occurs. Here, the magnitude $T_A$ of the torque of the input shaft 6 is obtained by the following equation (16), and the magnitude $T_B$ of the torque of the input shaft 17 is obtained by the following equation (17).

$$T_A = T_{MG} \times (1-\rho) \quad (16)$$

$$T_B = T_{MG} \times \rho \quad (17)$$

The torque $T_0$ transmitted to the driving wheel 46 is calculated by the following equation (18). When the equation (7), the equation (8), the equation (16), and the equation (17) are applied to the equation (18) and ½ is applied to $\rho$, the following equation (19) may be obtained.

$$T_0 = T_D - T_C \quad (18)$$

$$T_0 = (G2-G1) \times \tfrac{1}{2} \times T_{MG} \quad (19)$$

When the power circulation ratio $\delta$ is defined as $T_C/T_D$, the following equation (20) is obtained from the equation (7), the equation (8), the equation (16), and the equation (17).

$$\delta = 1/\gamma \quad (20)$$

(Case of Ratio $\gamma$ of Gear Ratios<1)

As illustrated in FIG. 30, when the ratio $\gamma$ of gear ratios is smaller than 1, the torque of the rotating electrical machine 3 is transmitted through the first transmission unit 70 and the drive shaft 45 to the driving wheel 46. A part of the motor torque is transmitted to the sun gear 61 through the second transmission unit 80, and hence the power circulation occurs. The torque $T_0$ transmitted to the driving wheel 46 is calculated by the following equation (21).

$$T_0 = T_C - T_D = (G1-G2) \times \tfrac{1}{2} \times T_{MG} \quad (21)$$

Further, the power circulation ratio $\delta$ is calculated by the following equation (22).

$$\delta = T_D/T_C = \gamma \quad (22)$$

Figure 32:
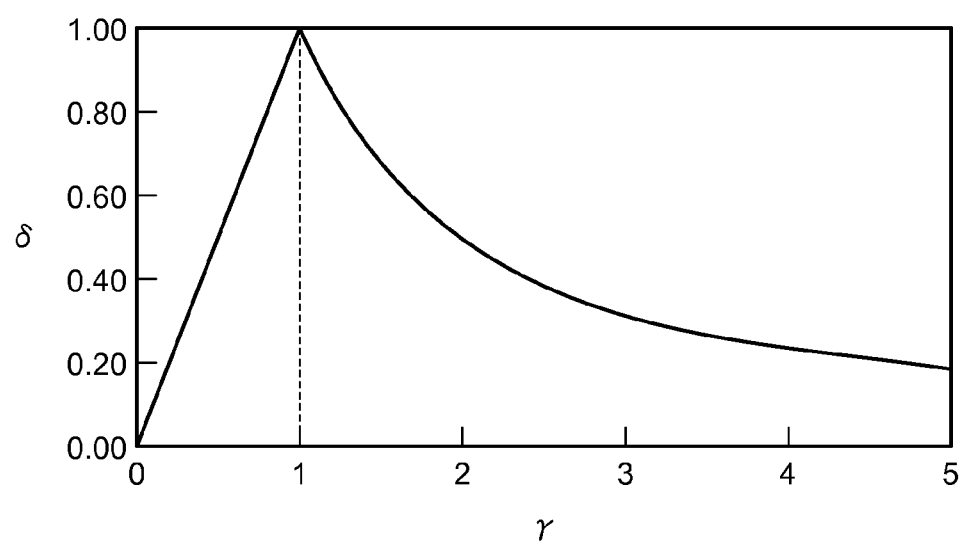
FIG. 32 is a diagram illustrating a relation between the ratio γ of gear ratios and a power circulation ratio δ.

From the equation (20) and the equation (22), a relation between the ratio $\gamma$ of gear ratios and the power circulation ratio $\delta$ illustrated in FIG. 32 may be obtained. The power circulation ratio becomes 100% when the power circulation ratio $\delta$ is 1. This is the case where the ratio $\gamma$ of gear ratios is 1 from the equation (20) and the equation (22). The alignment chart at this time is depicted as illustrated in FIG. 27, and hence the power is not transmitted to the driving wheel 46. Furthermore, the flow (in the EV powering operation) of the power from the rotating electrical machine 3 to the driving wheel 46 in the power circulation has been described so far, but the power flow direction becomes opposite in the regeneration operation. However, the relation between the ratio $\gamma$ of gear ratios and the power circulation ratio $\gamma$ does not change in the EV powering operation and the regeneration operation. As illustrated in FIG. 32, the power circulation ratio $\delta$ becomes maximal when the ratio $\gamma$ of gear ratios is 1, and decreases as the ratio $\gamma$ of gear ratios is deviated from 1.

Figure 33:
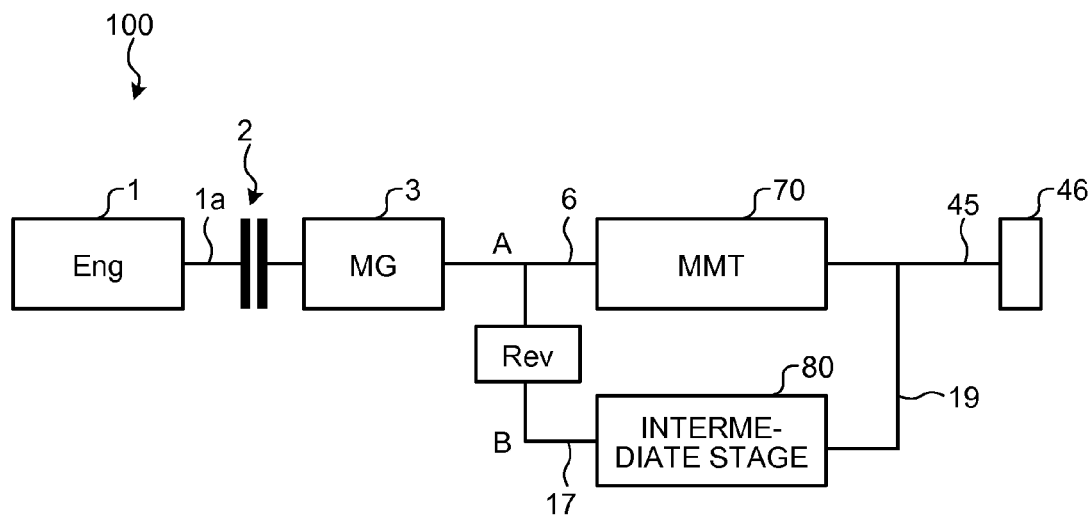
FIG. 33 is an equivalent diagram of a predetermined mode of a vehicle according to the first modified example of the embodiment.
Figure 34:
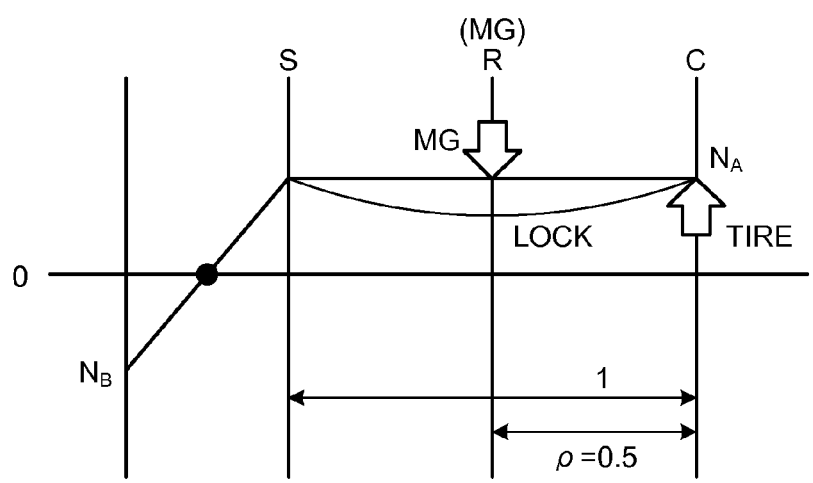
FIG. 34 is an alignment chart of a regeneration operation performed by a predetermined mode in the first modified example.

The vehicle driving device 1-2 according to the modified example has a predetermined mode similarly to the vehicle driving device 1-1 of the above-described embodiment. In the predetermined mode, the vehicle driving device 1-2 causes the second transmission unit 80 to enter the neutral state. Further, the vehicle driving device 1-2 regulates the differential operation of the differential mechanism 60 by the lock mechanism 40 and connects the rotating electrical machine 3 and the drive shaft 45 to each other through the first transmission unit 70. FIG. 33 is an equivalent diagram in the predetermined mode of the vehicle 100 according to the first modified example, and FIG. 34 is an alignment chart of the regeneration operation of the predetermined mode in the first modified example.

When the regeneration operation is performed during the engine running operation, for example, when the regeneration operation is performed in the down-shift standby state, the ECU 50 causes the second transmission unit 80 to enter the neutral state and causes the rotation number of the sun gear 61 to be equal to the rotation number of the carrier 64 by the rotation number control of the rotating electrical machine 3. Accordingly, as illustrated in FIG. 34, the rotation number $N_B$ of the input shaft 17 of the second transmission unit 80 is equal to the rotation number $N_A$ of the input shaft 6 of the first transmission unit 70. Further, the rotation number has a sign opposite to that of the rotation number $N_A$ of the input shaft 6. The vehicle driving device 1-2 connects the sun gear 61 and the carrier 64 to each other by the lock mechanism 40 when the rotation number of the sun gear 61 is synchronized with the rotation number of the carrier 64.

Since the differential operation of the differential mechanism 60 is locked, the drive system of the vehicle 100 is equivalent to the configuration illustrated in FIG. 33. That is, the rotating electrical machine 3 is directly connected to the input shaft 6 of the first transmission unit 70, and the input shaft 17 of the second transmission unit 80 is connected to the input shaft 6 through a counter gear (Rev). Accordingly, the input shaft 6 and the input shaft 17 rotate in the opposite directions. When any one of the first transmission unit 70 and the second transmission unit 80 enters the neutral state and the rotating electrical machine 3 and the drive shaft 45 are connected to each other through the other transmission unit while the differential operation of the differential mechanism 60 is locked, it is possible to transmit the power without the occurrence of the power circulation. In the modified example, the second transmission unit 80 enters the neutral state, and the rotating electrical machine 3 and the drive shaft 45 are connected to each other through the first transmission unit 70 during the regeneration operation. Since the second transmission unit 80 enters the neutral state, a power is transmitted from the driving wheel 46 to the rotating electrical machine 3 through the first transmission unit 70 at the high transmission efficiency without the occurrence of the power circulation.

Figure 35:
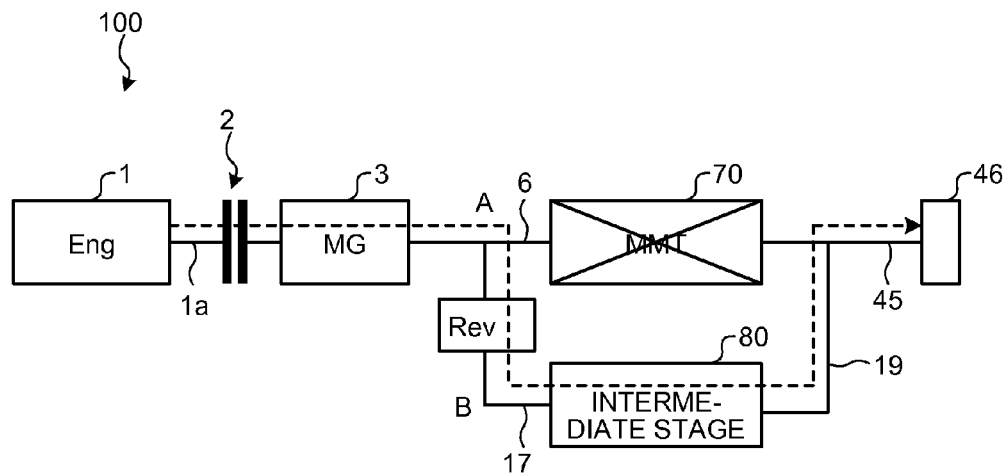
FIG. 35 is a diagram illustrating a reverse running operation by a predetermined mode in the first modified example.

In the case where the vehicle 100 runs backward, the vehicle driving device 1-2 locks the differential operation of the differential mechanism 60 by the lock mechanism 40 and engages an appropriate speed shift stage in the second transmission unit 80 by maintaining the first transmission unit 70 in the neutral state. FIG. 35 is a diagram illustrating a state where the vehicle runs by the predetermined mode in the first modified example. As illustrated in FIG. 33, in the predetermined mode of the vehicle driving device 1-2 according to the modified example, the engine 1 or the rotating electrical machine 3 is connected to the input shaft 17 of the second transmission unit 80 through the counter gear. That is, when the differential operation of the differential mechanism 60 is regulated, the rotation direction of the rotation transmitted from the engine 1 to the drive shaft 45 through the second transmission unit 80 is switched to the rotation direction of causing the vehicle 100 to run backward. In other words, when the differential operation of the differential mechanism 60 is regulated, the rotation direction of the rotation transmitted from the engine 1 to the drive shaft 45 through the second transmission unit 80 is the rotation direction causing the vehicle 100 to run backward. Thus, when the engine torque or the motor torque is transmitted to the drive shaft 45 through the second transmission unit 80 in the case where the vehicle runs backward, the reverse running speed shift stage is not needed.

That is, in the predetermined mode when the vehicle runs backward, the first transmission unit 70 corresponds to the second shaft, and the second transmission unit 80 corresponds to the first shaft. In this way, it is possible to appropriately change whether any one of the first transmission unit 70 and the second transmission unit 80 corresponds to the first shaft in the predetermined mode.

Second Modified Example of Embodiment

Figure 36:
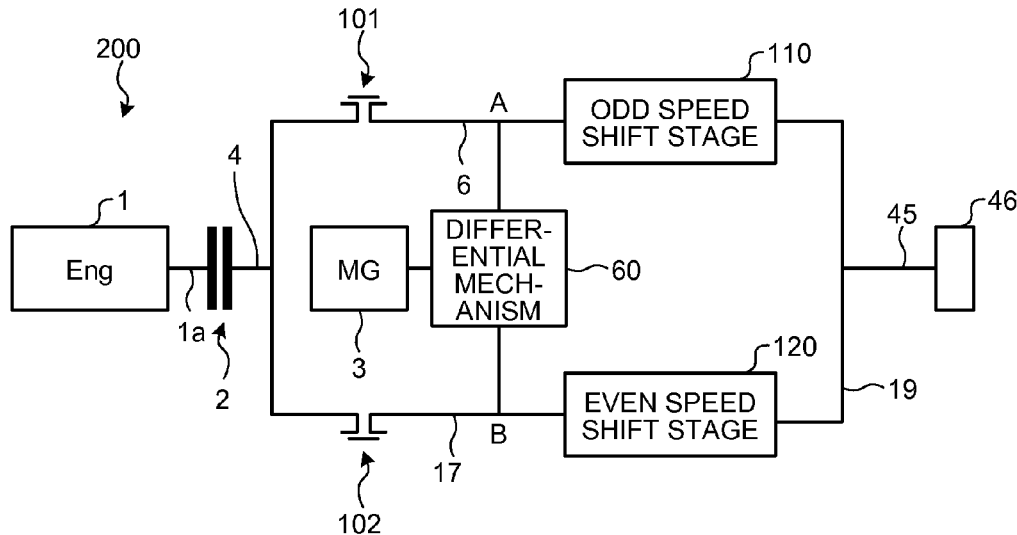
FIG. 36 is a schematic configuration diagram of a vehicle according to a second modified example of the embodiment.

A second modified example of the embodiment will be described. The vehicle 100 according to the above-described embodiment and the first modified example includes the MMT as the transmission unit, but the configuration of the transmission unit is not limited thereto. A vehicle 200 according to the modified example includes a DCT (Dual Clutch Transmission) as a transmission unit. FIG. 36 is a schematic configuration diagram of the vehicle 200 according to the second modified example, and FIG. 37 is a skeleton diagram of the vehicle 200 according to the second modified example.

As illustrated in FIG. 36, the DCT includes a first transmission unit 110, a second transmission unit 120, a first clutch 101, and a second clutch 102. Further, a vehicle driving device 1-3 according to the second modified example includes the rotating electrical machine 3, the first transmission unit 110, and the second transmission unit 120. Furthermore, the vehicle driving device 1-3 may further include the first clutch 101 and the second clutch 102 or an ECU 150.

The first clutch 101 is a clutch device which connects or disconnects the rotation shaft 4 to or from the input shaft 6 of the first transmission unit 110. The first transmission unit 110 is a transmission unit which forms an odd speed shift stage. The second clutch 102 is a clutch device which connects or disconnects the rotation shaft 4 to or from the input shaft 17 of the second transmission unit 120. The second transmission unit 120 is a transmission unit which forms an even speed shift stage. The rotating electrical machine 3, the input shaft 6 of the first transmission unit 110, and the input shaft 17 of the second transmission unit 120 are connected to one another through the differential mechanism 60. Further, the first transmission unit 110 and the second transmission unit 120 are connected to the drive shaft 45 through the common output shaft 19.

Figure 37:
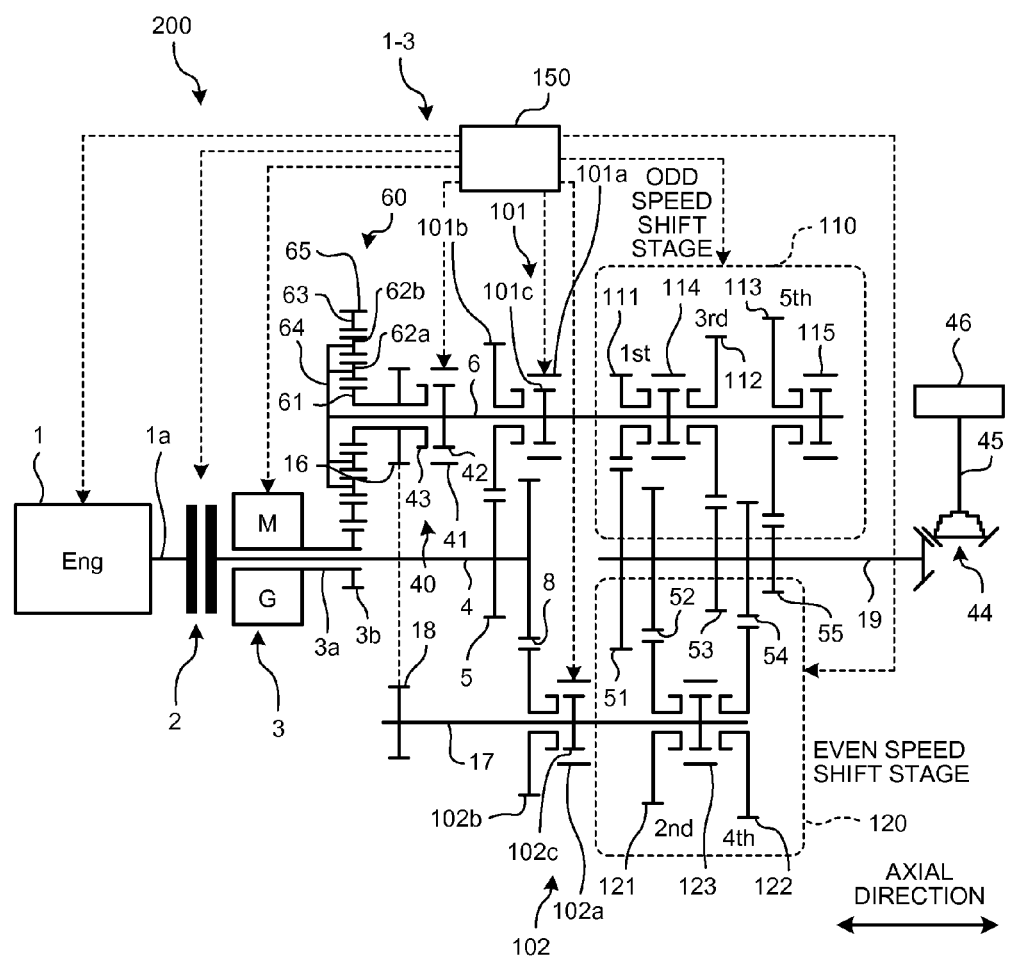
FIG. 37 is a skeleton diagram of the vehicle according to the second modified example.

As illustrated in FIG. 37, the differential mechanism 60 may be configured as the double pinion type planetary gear mechanism similar to the differential mechanism 60 of the first modified example. Further, the lock mechanism 40 may connect the sun gear 61 and the carrier 64 to each other similarly to the lock mechanism 40 of the first modified example.

The rotation shaft 4 is provided with the drive gears 5 and 8. The drive gear 5 is connected to the input shaft 6 of the first transmission unit 110 through the first clutch 101. Specifically, the first clutch 101 includes a sleeve 101a, a driven gear 101b, and a fixed engagement component 101c. The fixed engagement component 101c is an engagement component which is connected to the input shaft 6 and rotates together with the input shaft 6. The driven gear 101b is disposed so as to be coaxial with the input shaft 6, and is supported so as to be rotatable with respect to the input shaft 6. The driven gear 101b meshes with the drive gear 5. The sleeve 101a engages or releases the fixed engagement component 101c and the engagement component of the driven gear 101b while being driven by the actuator so as to be moved in the axial direction.

When the fixed engagement component 101c and the driven gear 101b engage with each other, the driven gear 101b is connected to the input shaft 6, and the driven gear 101b and the input shaft 6 rotate together. Thus, in this case, a power is transmitted between the rotation shaft 4 and the input shaft 6.

The first transmission unit 110 includes the input shaft 6, drive gears 111, 112, and 113, sleeves 114 and 115, driven gears 51, 53, and 55, and the output shaft 19. The drive gears 111, 112, and 113 are respectively supported so as to be rotatable with respect to the input shaft 6. The driven gears 51, 53, and 55 are respectively connected to the output shaft 19, and rotate together with the output shaft 19.

The drive gear 111 and the driven gear 51 make a pair of meshing gears of a first speed shift stage, the drive gear 112 and the driven gear 53 make a pair of meshing gears of a third speed shift stage, and the drive gear 113 and the driven gear 55 make a pair of meshing gears of a fifth speed shift stage.

The first transmission unit 110 may connect any one of the drive gears 111, 112, and 113 to the input shaft 6 by driving the sleeves 114 and 115 by the actuator so as to move in the axial direction. Accordingly, the input shaft 6 and the output shaft 19 are connected to each other through any pairs of gears of the first speed shift stage, the third speed shift stage, and the fifth speed shift stage as odd stages, and hence the rotation may be transmitted at the gear ratio of the pair of gears.

Further, the first transmission unit 110 may enter the neutral state by releasing all drive gears 111, 112, and 113.

The drive gear 8 of the rotation shaft 4 is connected to the input shaft 17 of the second transmission unit 120 through the second clutch 102. Specifically, the second clutch 102 includes a sleeve 102a, a driven gear 102b, and a fixed engagement component 102c. The fixed engagement component 102c is an engagement component which is connected to the input shaft 17 and rotates together with the input shaft 17. The driven gear 102b is disposed so as to be coaxial with the input shaft 17, and is supported so as to be rotatable with respect to the input shaft 17. The driven gear 102b meshes with the drive gear 8. The sleeve 102a engages or releases the fixed engagement component 102c and the engagement component of the driven gear 102b while being driven by the actuator so as to be moved in the axial direction.

When the fixed engagement component 102c engages with the driven gear 102b, the driven gear 102b is connected to the input shaft 17, and hence the driven gear 102b and the input shaft 17 rotates together. Thus, in this case, a power is transmitted between the rotation shaft 4 and the input shaft 17.

The second transmission unit 120 includes the input shaft 17, drive gears 121 and 122, a sleeve 123, driven gears 52 and 54, and the output shaft 19. The drive gears 121 and 122 are respectively supported so as to be rotatable with respect to the input shaft 17. The driven gears 52 and 54 are respectively connected to the output shaft 19, and rotate together with the output shaft 19.

The drive gear 121 and the driven gear 52 make a pair of meshing gears of a second speed shift stage, and the drive gear 122 and the driven gear 54 make a pair of meshing gears of a fourth speed shift stage.

The second transmission unit 120 may connect any one of the drive gears 121 and 122 to the input shaft 17 by driving the sleeve 123 by the actuator so as to move in the axial direction. Accordingly, the input shaft 17 is connected to the output shaft 19 through any pair of gears of the second speed shift stage or the fourth speed shift stage as the even stage, and hence the rotation may be transmitted at the gear ratio of the pair of gears. Further, the second transmission unit 120 may enter the neutral state by releasing all drive gears 121 and 122.

In this way, since the odd stage is disposed in the first transmission unit 110 and the even stage is disposed in the second transmission unit 120, the up-shift operation or the down-shift operation may be performed by switching the power transmission unit from the first transmission unit 110 to the second transmission unit 120 or from the second transmission unit 120 to the first transmission unit 110. Thus, the responsiveness of the gear-shift operation is improved and the losing of the drive power is suppressed, so that the drivability is improved.

When the up-shift operation or the down-shift operation is estimated during the engine running operation and the like, the ECU 150 may form the target speed shift stage after the gear shift operation in advance, and may remain in a standby state. For example, when the up-shift operation is estimated while the vehicle runs at the first speed shift stage, the ECU 150 forms the second speed shift stage in the second transmission unit 120, and may remain in a standby state by releasing the second clutch 102. When the up-shift operation is performed, the up-shift operation may be promptly performed by engaging the second clutch 102 and releasing the first clutch 101. The same applies to the down-shift operation. The ECU 150 may form the target speed shift stage after the gear shift operation in the transmission unit to which a power is not transmitted currently, and may remain in a standby state.

Figure 38:
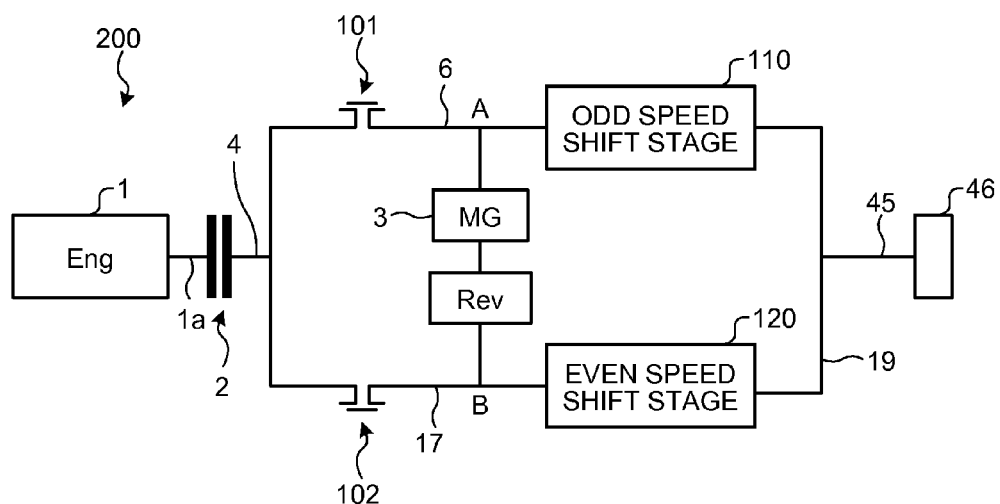
FIG. 38 is an equivalent diagram of a predetermined mode of the vehicle according to the second modified example.

The vehicle driving device 1-3 according to the modified example has a predetermined mode similarly to the vehicle driving device 1-1 of the above-described embodiment and the vehicle driving device 1-2 of the first modified example. FIG. 38 is an equivalent diagram of the predetermined mode of the vehicle 200 according to the second modified example. When the regeneration operation is performed during the engine running operation, for example, when the regeneration operation is performed in the down-shift standby state, the ECU 150 sets the rotation number of the sun gear 61 to be equal to the rotation number of the carrier 64 by the rotation number control of the rotating electrical machine 3. The ECU 150 connects the sun gear 61 to the carrier 64 by the lock mechanism 40 when the rotation number of the sun gear 61 is synchronized with the rotation number of the carrier 64.

When the differential operation of the differential mechanism 60 is locked, the drive system of the vehicle 200 is equivalent to the configuration illustrated in FIG. 38. That is, the rotating electrical machine 3 is directly connected to the input shaft 6 of the first transmission unit 110, and the input shaft 17 of the second transmission unit 120 is connected to the input shaft 6 through a counter gear, so that the input shaft 17 rotates in a direction opposite to the rotation direction of the input shaft 6. When any one of the first transmission unit 110 and the second transmission unit 120 enters the neutral state and the rotating electrical machine 3 and the drive shaft 45 are connected to each other through the other transmission unit while the differential operation of the differential mechanism 60 is locked, it is possible to transmit the power without the occurrence of the power circulation.

When the regeneration operation is performed in the odd stage, for example, the second clutch 102 is released and the second transmission unit 120 is set to the neutral state. In this case, the second transmission unit 120 corresponds to the second shaft. Meanwhile, when the regeneration operation is performed in the even stage, for example, the first clutch 101 is released and the first transmission unit 110 is set to the neutral state. In this case, the first transmission unit 110 corresponds to the second shaft.

Figure 39:
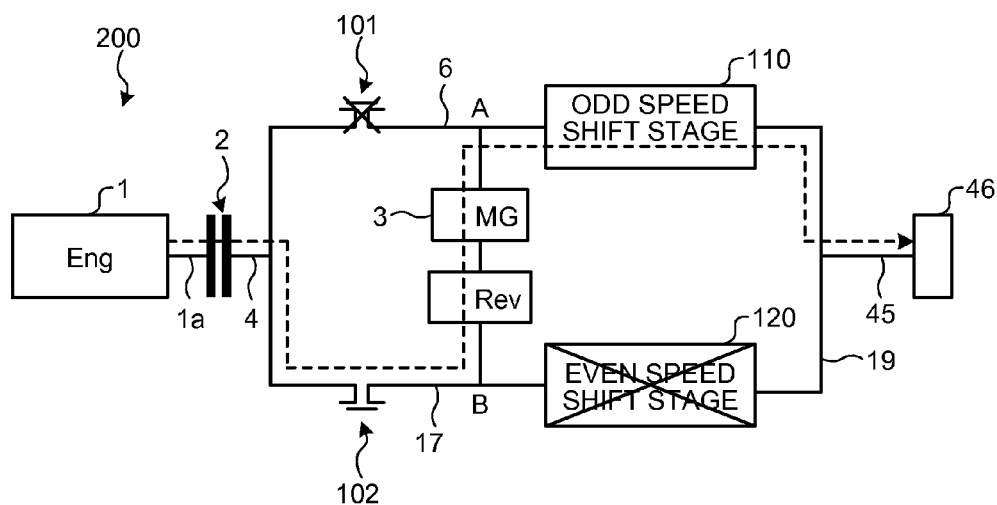
FIG. 39 is a diagram illustrating a reverse running operation performed by a predetermined mode in the second modified example.

FIG. 39 is a diagram illustrating a state where the vehicle runs backward by the predetermined mode in the second modified example. When the vehicle 200 runs backward, the ECU 150 transmits a power to the drive shaft 45 through the first transmission unit 110 by releasing the first clutch 101, engaging the second clutch 102, and causing the second transmission unit 120 to enter the neutral state. Accordingly, the EV reverse running operation may be switched to the engine reverse running operation or the engine reverse running operation may be switched to the EV reverse running operation without requiring the change of the speed shift stages of the transmission units 110 and 120 or the engagement/release of the clutches 101 and 102. Thus, it is possible to suppress the losing of the drive power or the slow feeling when the EV reverse running operation and the engine reverse running operation are switched.

Third Modified Example of Embodiment

A third modified example of the embodiment will be described. In the above-described embodiment and the modified examples, the regeneration operation is performed by the predetermined mode when the engine running operation is switched to the regeneration operation. However, even when the engine running operation is switched to the regeneration operation, the predetermined mode may not be performed in accordance with a state such as estimated transmission efficiency. Here, the determination on whether to perform the regeneration operation by the predetermined mode will be described by exemplifying the vehicle 100 equipped with the vehicle driving device 1-1 of the above-described embodiment.

Figures 40, 41:
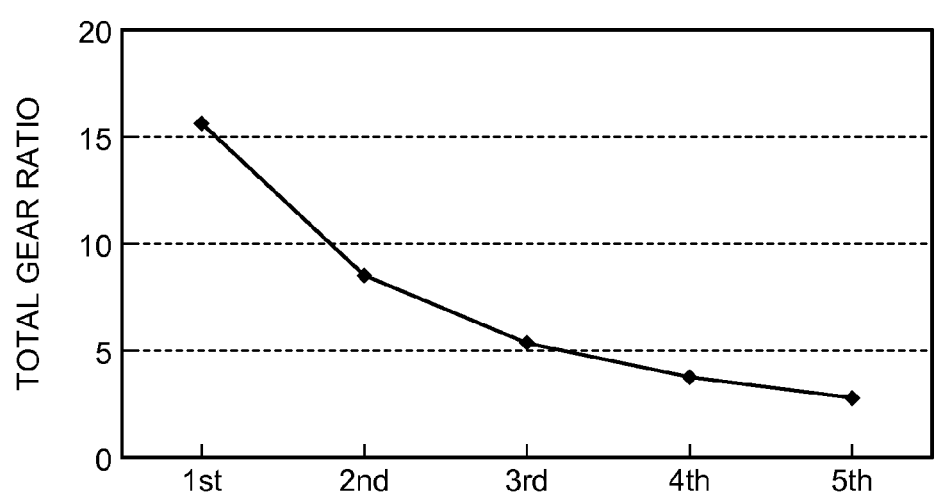
FIG. 40 is a diagram illustrating an example of a gear ratio of the vehicle driving device.
FIG. 41 is a diagram illustrating an example of a total gear ratio of the vehicle.
Figures 42, 43:
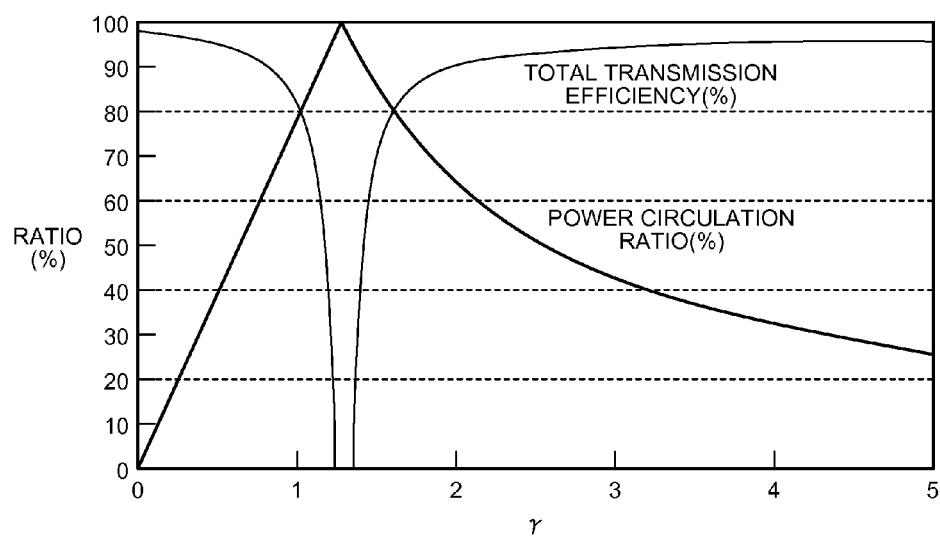
FIG. 42 is a diagram illustrating total transmission efficiency η and a power circulation ratio δ with respect to the ratio γ of gear ratios.
FIG. 43 is a diagram illustrating the power circulation ratio δ and the total transmission efficiency η of a standby state of each speed shift stage.

FIG. 40 is a diagram illustrating an example of the gear ratio of the vehicle driving device 1-1, FIG. 41 is a diagram illustrating an example of the total gear ratio of the vehicle 100, FIG. 42 is a diagram illustrating the total transmission efficiency η (%) and the power circulation ratio δ (%) with respect to the ratio γ of gear ratios, and FIG. 43 is a diagram illustrating the power circulation ratio δ and the total transmission efficiency according to the standby state in each speed shift stage.

As illustrated in FIG. 40, when the gear ratio of the speed shift stages of the first transmission unit 20 and the second transmission unit 30 and the differential ratio are determined, the total gear ratio (the gear ratio of each speed shift stage×the differential ratio) is indicated by FIG. 41. Further, the relation among the ratio γ of gear ratios, the total transmission efficiency η, and the power circulation ratio δ is indicated by FIG. 42. In FIG. 42, the horizontal axis indicates the ratio γ of gear ratios, and the vertical axis indicates the power circulation ratio δ (%) and the total transmission efficiency η (%). Here, the total transmission efficiency η indicates the transmission efficiency between the rotating electrical machine 3 and the driving wheel 46 in the predetermined mode. The total transmission efficiency η is set on the assumption that the gear transmission efficiency of each of the first transmission unit 20 and the second transmission unit 30 is 98%. Furthermore, in the modified example, the gear ratio ρ of the differential mechanism 10 is set to 0.3. As understood from FIG. 42, the total transmission efficiency η sharply decreases as the ratio γ of gear ratios approaches the equation of $(\rho+1)=1.3$.

FIG. 43 illustrates the speed shift stage (the intermediate stage) of the second transmission unit 30 selected when the up-shift operation or the down-shift operation is estimated with respect to the speed shift stage (the current stage) before the gear shift operation of the first transmission unit 20. Further, the ratio γ of gear ratios, the power circulation ratio δ, and the total transmission efficiency η in the combination of the current stage and the intermediate stage are illustrated.

For example, when the current stage is the second speed shift stage (2nd) and the next down-shift operation is estimated, the first speed shift stage (1st) is selected as the intermediate stage. In the combination of the current stage and the intermediate stage, the ratio γ of gear ratios of 1.84, the power circulation ratio δ of 70.6%, and the total transmission efficiency η of 88.4% are calculated for the case where the regeneration operation or the powering operation is performed by the rotating electrical machine 3 at the current speed shift stage without transition to the predetermined mode. The ratio γ of gear ratios, the power circulation ratio δ, and the total transmission efficiency η may be calculated even in the other standby state. Furthermore, in the combination of the intermediate stage and the current stage in which the total transmission efficiency η indicates a minus value, a power may not be transmitted between the rotating electrical machine 3 and the driving wheel 46.

It is possible to determine whether to switch to the predetermined mode based on the power circulation ratio δ or the total transmission efficiency η calculated in this way. For example, in the standby state of the combination of the intermediate stage and the current stage in which the total transmission efficiency η becomes a minus value, the regeneration operation may not be performed in such a state, and hence the regeneration operation needs to be performed by the predetermined mode. Further, the ratio γ of gear ratios, the power circulation ratio δ, and the total transmission efficiency η have a predetermined corresponding relation, and the power circulation ratio δ or the total transmission efficiency η is determined from the ratio γ of gear ratios. For this reason, for example, when the ratio γ of gear ratios is a value within a predetermined range, the predetermined mode may be set. Alternatively, the predetermined mode may be set based on the transmission efficiency such as the total transmission efficiency η.

Further, it is possible to determine whether to switch the predetermined mode based on the time necessary for the switching to the predetermined mode, that is, the time necessary for a transition to the predetermined mode. For example, when the up-shift operation is estimated, the speed shift stage of the current stage and the intermediate stage is set equal as illustrated in FIG. 43. Thus, it is possible to promptly select the predetermined mode from the up-shift standby state.

Specifically, the rotation number $N_A$ of the input shaft 6 of the first transmission unit 20 is equal to the rotation number $N_B$ of the input shaft 17 of the second transmission unit 30 in the up-shift standby state during the engine running operation. For this reason, there is a need to perform three procedures (i) to (iii) described below for transition from the down-shift standby state to the predetermined mode. On the contrary, only the procedure (iii) is needed for transition from the up-shift standby state to the predetermined mode.

(i) The second transmission unit 30 enters the neutral state.

(ii) The rotation number $N_B$ of the input shaft 17 of the second transmission unit 30 is set to be equal to the rotation number $N_A$ of the input shaft 6 of the first transmission unit 20 by the rotation number control of the rotating electrical machine 3.

(iii) The differential operation of the differential mechanism 10 is locked by the lock mechanism 40.

Thus, it is desirable to actively perform the regeneration operation by the predetermined mode in the up-shift standby state of the vehicle driving device 1-1. Furthermore, in the up-shift standby state of the vehicle driving device 1-1, a standby time may be spent while the differential operation of the differential mechanism 10 is locked. Since the regeneration operation is suddenly performed, the regeneration operation may be performed by 100% when a standby time is spent while the differential operation of the differential mechanism 10 is locked in advance. Further, if it is determined that the gear shift operation needs to be performed when a standby time is spent while the differential operation of the differential mechanism 10 is locked, the gear shift operation may be performed by releasing the differential lock state of the differential mechanism 10.

Further, in the down-shift standby state of the vehicle driving device 1-1, it is possible to determine whether to perform the regeneration operation by the predetermined mode based on the total transmission efficiency η. In the regeneration operation by the predetermined mode, the power circulation does not occur. For this reason, the loss occurring between the rotating electrical machine 3 and the driving wheel 46 is only the loss of the first transmission unit 20. Thus, the total transmission efficiency η becomes 98% in the case of the modified example. Thus, the transmission efficiency in the regeneration operation may be improved after the transition to the predetermined mode compared to the case where the regeneration operation is performed without the transition to the predetermined mode. Meanwhile, there is a need to ensure some time for the transition to the predetermined mode. Thus, there is a disadvantage that the regeneration operation may not be performed while the procedures (i) to (iii) are performed.

For this reason, a regeneration method with good fuel efficiency may be performed by estimating the fuel efficiency in each of the case where the regeneration operation is performed after the transition to the predetermined mode and the case where the regeneration operation is performed without the transition to the predetermined mode. As the parameters used for the determination, for example, an estimated regeneration amount, a battery charged state, a requested braking force, a vehicle or a barrier in front of the own vehicle, a traffic situation in front of the own vehicle, a running route to a target place, and the other environmental circumstances of the vehicle 100 may be exemplified.

FIG. 44 is a diagram illustrating an example of the power circulation ratio δ and the total transmission efficiency η in the standby state of each speed shift stage of the vehicle 100 according to the first modified example.

In the vehicle 100 according to the first modified example, it is possible to determine whether to switch to the predetermined mode based on the power circulation ratio δ or the total transmission efficiency η.

FIG. 45 is a diagram illustrating the power circulation ratio δ and the total transmission efficiency η in the standby state of each speed shift stage of the vehicle 200 according to the second modified example. In the vehicle 200 according to the second modified example, it is possible to determine whether to switch to the predetermined mode based on the power circulation ratio δ or the total transmission efficiency η.

The content disclosed in the above-described embodiment and the modified examples may be implemented by the appropriate combination thereof.

REFERENCE SIGNS LIST 1-1, 1-2, 1-3 VEHICLE DRIVING DEVICE
1 ENGINE
3 ROTATING ELECTRICAL MACHINE
6 INPUT SHAFT
10, 60 DIFFERENTIAL MECHANISM
11 SUN GEAR
12 PINION GEAR
13 RING GEAR
14 CARRIER
17 INPUT SHAFT
19 OUTPUT SHAFT
20, 70, 110 FIRST TRANSMISSION UNIT
30, 80, 120 SECOND TRANSMISSION UNIT
40 LOCK MECHANISM
45 DRIVE SHAFT
46 DRIVING WHEEL
50 ECU
100 VEHICLE
γ RATIO OF GEAR RATIOS
δ POWER CIRCULATION RATIO
η TOTAL TRANSMISSION EFFICIENCY

The invention claimed is:

1. A vehicle comprising:
a rotating electrical machine;
first and second shafts configured to be respectively connected to drive shafts;
a differential mechanism configured to include a rotation component connected to the rotating electrical machine, a rotation component connected to the first shaft, and a rotation component connected to the second shaft;
a transmission mechanism which is provided in each of the first shaft and the second shaft; and
a controller, wherein
the controller performs an EV running mode in which the transmission mechanisms of the first shaft and the second shaft respectively form speed shift stages, the rotating electrical machine and the drive shaft are connected to each other through the first shaft and the second shaft, and generate a balance in force in the differential mechanism so that the torque is transmitted from the rotating electrical machine to the drive shaft, and a predetermined mode in which a transmission of a power through the second shaft is disconnected, a differential operation of the differential mechanism is regulated, and the rotating electrical machine and the drive shaft are connected to each other through the first shaft,
wherein power is output from the first and second shafts to the drive shaft simultaneously, and
wherein the drive shaft is connected to the driving wheel.

2. The vehicle according to claim 1, wherein
the controller performs the predetermined mode at the time a ratio between a gear ratio of the transmission mechanism of the first shaft and a gear ratio of the transmission mechanism of the second shaft is a value within a predetermined range.

3. The vehicle according to claim 1, wherein
the controller performs the predetermined mode based on transmission efficiency determined from a ratio between a gear ratio of the transmission mechanism of the first shaft and a gear ratio of the transmission mechanism of the second shaft.

4. The vehicle according to claim 1, wherein
the controller performs a regeneration operation by the rotating electrical machine in the predetermined mode.

5. The vehicle according to claim 1, wherein
the controller performs the predetermined mode at the time the vehicle runs backward.

6. The vehicle according to claim 5, further comprising:
an engine which is connected to the first shaft, wherein
at the time the differential operation of the differential mechanism is regulated, a rotation direction of a rotation transmitted from the engine to the drive shaft through the first shaft is switched to a rotation direction causing the vehicle to run backward.

7. The vehicle according to claim 1, further comprising:
an engine which is connected to the first shaft and the second shaft through a clutch; wherein
the controller performs the predetermined mode at the time a regeneration operation is performed by the rotating electrical machine with the clutch released while the vehicle runs by using the engine as a power source with the clutch engaged.

8. The vehicle according to claim 2, wherein
the controller performs a regeneration operation by the rotating electrical machine in the predetermined mode.

9. The vehicle according to claim 3, wherein the controller performs a regeneration operation by the rotating electrical machine in the predetermined mode.

* * * * *